(12) United States Patent
Leabman

(10) Patent No.: US 10,523,058 B2
(45) Date of Patent: Dec. 31, 2019

(54) WIRELESS CHARGING TRANSMITTERS THAT USE SENSOR DATA TO ADJUST TRANSMISSION OF POWER WAVES

(71) Applicant: Energous Corporation, San Jose, CA (US)

(72) Inventor: Michael A. Leabman, San Ramon, CA (US)

(73) Assignee: ENERGOUS CORPORATION, San Jose, CA (US)

( * ) Notice: Subject to any disclaimer, the term of this patent is extended or adjusted under 35 U.S.C. 154(b) by 0 days.

(21) Appl. No.: 16/115,495

(22) Filed: Aug. 28, 2018

(65) Prior Publication Data

US 2019/0089203 A1 Mar. 21, 2019

Related U.S. Application Data

(63) Continuation of application No. 14/757,568, filed on Dec. 24, 2015, now Pat. No. 10,063,105, which is a
(Continued)

(51) Int. Cl.
*H02J 50/15* (2016.01)
*H02J 50/60* (2016.01)
*H02J 50/20* (2016.01)

(52) U.S. Cl.
CPC ............ *H02J 50/15* (2016.02); *H02J 50/20* (2016.02); *H02J 50/60* (2016.02)

(58) Field of Classification Search
CPC .. H02J 7/025; H02J 50/90; H02J 50/80; H02J 50/20; H02J 50/40; H02J 50/15; H02J 5/005
(Continued)

(56) References Cited

U.S. PATENT DOCUMENTS 787,412 A 4/1905 Tesla
3,167,775 A 1/1965 Guertler
(Continued)

FOREIGN PATENT DOCUMENTS

CN 102292896 A 12/2011
CN 102860037 A 1/2013
(Continued)

OTHER PUBLICATIONS

Energous Corp., IPRP, PCT/US2017/065886, dated Jun. 18, 2019, 10 pgs.
(Continued)

*Primary Examiner* — John W Poos
(74) *Attorney, Agent, or Firm* — Morgan, Lewis & Bockius LLP

(57) ABSTRACT

Disclosed herein are examples of wireless charging transmitters and methods. As one example, a wireless charging transmitter includes a sensor to detect the presence of a receiver device and/or a living being and the sensor generates data according to the presence detected. The wireless charging transmitter also includes an array of antennas configured to transmit power waves to the receiver device and a surface layer that is adjacent to the array of antennas. The transmitted power waves converge to form a constructive interference pattern at a non-zero distance from the surface layer. The non-zero distance being based on the sensor data. Further, the phases and amplitudes of the transmitted power waves are determined based, at least in part, on the sensor data.

20 Claims, 10 Drawing Sheets

Related U.S. Application Data continuation-in-part of application No. 14/861,285, filed on Sep. 22, 2015, now Pat. No. 9,948,135, which is a continuation-in-part of application No. 14/585,341, filed on Dec. 30, 2014, now Pat. No. 9,812,890, which is a continuation-in-part of application No. 13/939,706, filed on Jul. 11, 2013, now Pat. No. 9,143,000.

(58) Field of Classification Search
USPC .................................. 307/104, 105, 107
See application file for complete search history.

(56) References Cited

U.S. PATENT DOCUMENTS

| | | |
|---|---|---|
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,200,759 A | 4/1993 | McGinnis |
| 5,211,471 A | 5/1993 | Rohrs |
| 5,548,292 A | 8/1996 | Hirshfield et al. |
| 5,556,749 A | 9/1996 | Mitsuhashi et al. |
| 5,568,088 A | 10/1996 | Dent et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,127,799 A | 10/2000 | Krishnan |
| 6,127,942 A | 10/2000 | Welle |
| 6,163,296 A | 12/2000 | Lier et al. |
| 6,271,799 B1 | 8/2001 | Rief |
| 6,289,237 B1 | 9/2001 | Mickle et al. |
| 6,329,908 B1 | 12/2001 | Frecska |
| 6,400,586 B2 | 6/2002 | Raddi et al. |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Amdt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,664,920 B1 | 12/2003 | Mott et al. |
| 6,680,700 B2 | 1/2004 | Hilgers |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,079,079 B2 | 7/2006 | Jo et al. |
| 7,183,748 B1 | 2/2007 | Unno et al. |
| 7,191,013 B1 | 3/2007 | Miranda et al. |
| 7,193,644 B2 | 3/2007 | Carter |
| 7,196,663 B2 | 3/2007 | Bolzer et al. |
| 7,205,749 B2 | 4/2007 | Hagen et al. |
| 7,215,296 B2 | 5/2007 | Abramov et al. |
| 7,222,356 B1 | 5/2007 | Yonezawa et al. |
| 7,274,334 B2 | 9/2007 | o'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,372,408 B2 | 5/2008 | Gaucher |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 7,948,208 B2 | 5/2011 | Partovi et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,384,600 B2 | 2/2013 | Huang et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,601 B2 | 7/2013 | Hall et al. |
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,674,551 B2 | 3/2014 | Low et al. |
| 8,686,685 B2 | 4/2014 | Moshfeghi |
| 8,686,905 B2 | 4/2014 | Shtrom |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |

(56) References Cited

U.S. PATENT DOCUMENTS

| | | |
|---|---|---|
| 8,832,646 B1 | 9/2014 | Wendling |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,276,329 B2 | 3/2016 | Jones et al. |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,419,335 B2 | 8/2016 | Pintos |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,800,172 B1 | 10/2017 | Leabman |
| 9,806,564 B2 | 10/2017 | Leabman |
| 9,819,230 B2 | 11/2017 | Petras et al. |
| 9,825,674 B1 | 11/2017 | Leabman |
| 9,843,229 B2 | 12/2017 | Leabman |
| 9,847,669 B2 | 12/2017 | Leabman |
| 9,847,677 B1 | 12/2017 | Leabman |
| 9,853,361 B2 | 12/2017 | Chen et al. |
| 9,853,692 B1 | 12/2017 | Bell et al. |
| 9,859,758 B1 | 1/2018 | Leabman |
| 9,866,279 B2 | 1/2018 | Bell et al. |
| 9,867,032 B2 | 1/2018 | Verma et al. |
| 9,871,301 B2 | 1/2018 | Contopanagos |
| 9,876,380 B1 | 1/2018 | Leabman et al. |
| 9,876,394 B1 | 1/2018 | Leabman |
| 9,876,536 B1 | 1/2018 | Bell et al. |
| 9,882,394 B1 | 1/2018 | Bell et al. |
| 9,887,584 B1 | 2/2018 | Bell et al. |
| 9,893,555 B1 | 2/2018 | Leabman et al. |
| 9,893,564 B2 | 2/2018 | de Rochemont |
| 9,899,844 B1 | 2/2018 | Bell et al. |
| 9,899,861 B1 | 2/2018 | Leabman et al. |
| 9,917,477 B1 | 3/2018 | Bell et al. |
| 9,923,386 B1 | 3/2018 | Leabman et al. |
| 9,939,864 B1 | 4/2018 | Bell et al. |
| 9,965,009 B1 | 5/2018 | Bell et al. |
| 9,966,765 B1 | 5/2018 | Leabman |
| 9,966,784 B2 | 5/2018 | Leabman |
| 9,967,743 B1 | 5/2018 | Bell et al. |
| 9,973,008 B1 | 5/2018 | Leabman |
| 10,003,211 B1 | 6/2018 | Leabman et al. |
| 10,014,728 B1 | 7/2018 | Leabman |
| 10,027,159 B2 | 7/2018 | Hosseini |
| 10,038,337 B1 | 7/2018 | Leabman et al. |
| 10,050,462 B1 | 8/2018 | Leabman et al. |
| 10,056,782 B1 | 8/2018 | Leabman |
| 10,063,064 B1 | 8/2018 | Bell et al. |
| 10,068,703 B1 | 9/2018 | Contopanagos |
| 10,075,008 B1 | 9/2018 | Bell et al. |
| 10,090,699 B1 | 10/2018 | Leabman |
| 10,090,886 B1 | 10/2018 | Bell et al. |
| 10,103,552 B1 | 10/2018 | Leabman et al. |
| 10,122,219 B1 | 11/2018 | Hosseini et al. |
| 10,124,754 B1 | 11/2018 | Leabman |
| 10,128,686 B1 | 11/2018 | Leabman et al. |
| 10,134,260 B1 | 11/2018 | Bell et al. |
| 10,135,112 B1 | 11/2018 | Hosseini |
| 10,135,294 B1 | 11/2018 | Leabman |
| 10,141,771 B1 | 11/2018 | Hosseini et al. |
| 10,148,097 B1 | 12/2018 | Leabman et al. |
| 10,153,645 B1 | 12/2018 | Bell et al. |
| 10,153,660 B1 | 12/2018 | Leabman et al. |
| 10,155,653 B2 | 12/2018 | Tojima et al. |
| 10,158,257 B2 | 12/2018 | Leabman |
| 10,158,259 B1 | 12/2018 | Leabman |
| 10,164,478 B2 | 12/2018 | Leabman |
| 10,170,917 B1 | 1/2019 | Bell et al. |
| 10,181,756 B2 | 1/2019 | Bae et al. |
| 10,186,892 B2 | 1/2019 | Hosseini et al. |
| 10,193,396 B1 | 1/2019 | Bell et al. |
| 10,199,835 B2 | 2/2019 | Bell |
| 10,199,849 B1 | 2/2019 | Bell |
| 10,205,239 B1 | 2/2019 | Contopanagos et al. |
| 10,211,674 B1 | 2/2019 | Leabman et al. |
| 10,223,717 B1 | 3/2019 | Bell |
| 10,224,758 B2 | 3/2019 | Leabman et al. |
| 10,224,982 B1 | 3/2019 | Leabman |
| 10,230,266 B1 | 3/2019 | Leabman et al. |
| 10,243,414 B1 | 3/2019 | Leabman et al. |
| 10,256,657 B2 | 4/2019 | Hosseini et al. |
| 10,256,677 B2 | 4/2019 | Hosseini et al. |
| 10,263,432 B1 | 4/2019 | Leabman et al. |
| 10,263,476 B2 | 4/2019 | Leabman |
| 10,270,261 B2 | 4/2019 | Bell et al. |
| 10,277,054 B2 | 4/2019 | Hosseini et al. |
| 10,291,055 B1 | 5/2019 | Bell et al. |
| 10,291,066 B1 | 5/2019 | Leabman |
| 10,291,294 B2 | 5/2019 | Leabman |
| 10,298,024 B2 | 5/2019 | Leabman |
| 10,298,133 B2 | 5/2019 | Leabman |
| 10,305,315 B2 | 5/2019 | Leabman et al. |
| 10,312,715 B2 | 6/2019 | Leabman |
| 10,320,446 B2 | 6/2019 | Hosseini |

(56) References Cited

U.S. PATENT DOCUMENTS

| | | |
|---|---|---|
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pande et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0123776 A1 | 9/2002 | Von Arx |
| 2002/0133592 A1 | 9/2002 | Matsuda |
| 2002/0171594 A1 | 11/2002 | Fang |
| 2002/0172223 A1 | 11/2002 | Stilp |
| 2003/0005759 A1 | 1/2003 | Breed et al. |
| 2003/0038750 A1 | 2/2003 | Chen |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brien et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0155832 A1 | 8/2004 | Yuanzhu |
| 2004/0196190 A1 | 10/2004 | Mendolia et al. |
| 2004/0203979 A1 | 10/2004 | Attar et al. |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0077872 A1 | 4/2005 | Single |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |
| 2005/0237258 A1 | 10/2005 | Abramov et al. |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0033674 A1 | 2/2006 | Essig, Jr. et al. |
| 2006/0071308 A1 | 4/2006 | Tang et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0228833 A1 | 10/2007 | Stevens et al. |
| 2007/0240297 A1 | 10/2007 | Yang et al. |
| 2007/0257634 A1 | 11/2007 | Leschin et al. |
| 2007/0273486 A1 | 11/2007 | Shiotsu |
| 2007/0291165 A1 | 12/2007 | Wang |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Aledander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0010316 A1 | 1/2009 | Rofougaran et al. |
| 2009/0019183 A1 | 1/2009 | Wu et al. |
| 2009/0036065 A1 | 2/2009 | Siu |
| 2009/0039828 A1 | 2/2009 | Jakubowski |
| 2009/0047998 A1 | 2/2009 | Alberth, Jr. |
| 2009/0058354 A1 | 3/2009 | Harrison |
| 2009/0058361 A1 | 3/2009 | John |
| 2009/0058731 A1 | 3/2009 | Geary et al. |
| 2009/0060012 A1 | 3/2009 | Gresset et al. |
| 2009/0067198 A1 | 3/2009 | Graham et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |

(56) References Cited

U.S. PATENT DOCUMENTS

| | | |
|---|---|---|
| 2009/0157911 A1 | 6/2009 | Aihara |
| 2009/0174604 A1 | 7/2009 | Keskitalo |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0256752 A1 | 10/2009 | Akkermans et al. |
| 2009/0264069 A1 | 10/2009 | Yamasuge |
| 2009/0271048 A1 | 10/2009 | Wakamatsu |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0299175 A1 | 12/2009 | Bernstein et al. |
| 2009/0308936 A1 | 12/2009 | Nitzan et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Benett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0079011 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117596 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0124040 A1 | 5/2010 | Diebel et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1* | 7/2010 | Szini .................. H04B 7/0617 455/73 |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Bauman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0109167 A1 | 5/2011 | Park et al. |
| 2011/0114401 A1 | 5/2011 | Kanno et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0148595 A1 | 6/2011 | Miller et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0193688 A1 | 8/2011 | Forsell |
| 2011/0194543 A1 | 8/2011 | Zhao et al. |

(56) References Cited

U.S. PATENT DOCUMENTS

| | | |
|---|---|---|
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0007441 A1 | 1/2012 | John |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0080944 A1 | 4/2012 | Recker et al. |
| 2012/0080957 A1 | 4/2012 | Cooper et al. |
| 2012/0086284 A1 | 4/2012 | Capanella et al. |
| 2012/0086615 A1 | 4/2012 | Norair |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212071 A1 | 8/2012 | Myabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306433 A1 | 12/2012 | Kim et al. |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0058379 A1 | 3/2013 | Kim et al. |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0076308 A1 | 3/2013 | Niskala et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |

(56) References Cited

U.S. PATENT DOCUMENTS

| | | |
|---|---|---|
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0091974 A1 | 4/2014 | Desclos et al. |
| 2014/0103869 A1 | 4/2014 | Radovic |
| 2014/0104157 A1* | 4/2014 | Burns .................... H01Q 1/243 345/156 |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0176082 A1 | 6/2014 | Visser |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0194095 A1 | 7/2014 | Wanstedt et al. |
| 2014/0197691 A1 | 7/2014 | Wang |
| 2014/0203629 A1 | 7/2014 | Hoffman et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0292451 A1 | 10/2014 | Zimmerman |
| 2014/0300452 A1 | 10/2014 | Rofe et al. |

(56) References Cited

U.S. PATENT DOCUMENTS

| | | |
|---|---|---|
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabamn |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0022194 A1 | 1/2015 | Almalki et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0029397 A1 | 1/2015 | Leabman et al. |
| 2015/0035378 A1 | 2/2015 | Calhoun et al. |
| 2015/0035715 A1 | 2/2015 | Kim et al. |
| 2015/0039482 A1 | 2/2015 | Fuinaga |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097442 A1 | 4/2015 | Muurinen |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0116153 A1 | 4/2015 | Chen et al. |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0137612 A1 | 5/2015 | Yamakawa et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171512 A1 | 6/2015 | Chen et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0180249 A1 | 6/2015 | Jeon et al. |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0201385 A1 | 7/2015 | Mercer et al. |
| 2015/0207333 A1 | 7/2015 | Bauman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | MacH et al. |
| 2015/0255989 A1 | 9/2015 | Walley et al. |
| 2015/0256097 A1 | 9/2015 | Gudan et al. |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leabman et al. |
| 2015/0280484 A1 | 10/2015 | Radziemski et al. |
| 2015/0288074 A1 | 10/2015 | Harper et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326051 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326071 A1 | 11/2015 | Contopanagos |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013560 A1 | 1/2016 | Daniels |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020647 A1 | 1/2016 | Leabman et al. |
| 2016/0020649 A1 | 1/2016 | Bell et al. |
| 2016/0020830 A1 | 1/2016 | Bell et al. |
| 2016/0028403 A1 | 1/2016 | McCaughan et al. |
| 2016/0042206 A1 | 2/2016 | Pesavento et al. |

(56) References Cited

U.S. PATENT DOCUMENTS

| | | |
|---|---|---|
| 2016/0054395 A1 | 2/2016 | Bell et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0112787 A1 | 4/2016 | Rich |
| 2016/0126749 A1 | 5/2016 | Shichino et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181849 A1 | 6/2016 | Govindaraj |
| 2016/0181854 A1 | 6/2016 | Leabman |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0202343 A1 | 7/2016 | Okutsu |
| 2016/0204622 A1 | 7/2016 | Leabman |
| 2016/0204642 A1 | 7/2016 | Oh |
| 2016/0233582 A1 | 8/2016 | Piskun |
| 2016/0238365 A1 | 8/2016 | Wixey et al. |
| 2016/0240908 A1 | 8/2016 | Strong |
| 2016/0248276 A1 | 8/2016 | Hong et al. |
| 2016/0294225 A1 | 10/2016 | Blum et al. |
| 2016/0299210 A1 | 10/2016 | Zeine |
| 2016/0301240 A1 | 10/2016 | Zeine |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2016/0380464 A1 | 12/2016 | Chin et al. |
| 2016/0380466 A1 | 12/2016 | Yang et al. |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0012448 A1 | 1/2017 | Miller et al. |
| 2017/0025903 A1 | 1/2017 | Song et al. |
| 2017/0026087 A1 | 1/2017 | Tanabe |
| 2017/0040700 A1 | 2/2017 | Leung |
| 2017/0043675 A1 | 2/2017 | Jones et al. |
| 2017/0047784 A1 | 2/2017 | Jung et al. |
| 2017/0187225 A1 | 2/2017 | Hosseini |
| 2017/0063168 A1 | 3/2017 | Uchida |
| 2017/0077733 A1 | 3/2017 | Jeong et al. |
| 2017/0077735 A1 | 3/2017 | Leabman |
| 2017/0077736 A1 | 3/2017 | Leabman |
| 2017/0077764 A1 | 3/2017 | Bell et al. |
| 2017/0077765 A1 | 3/2017 | Bell et al. |
| 2017/0077995 A1 | 3/2017 | Leabman |
| 2017/0085112 A1 | 3/2017 | Leabman et al. |
| 2017/0085120 A1 | 3/2017 | Leabman et al. |
| 2017/0085127 A1 | 3/2017 | Leabman |
| 2017/0085437 A1 | 3/2017 | Condeixa et al. |
| 2017/0092115 A1 | 3/2017 | Sloo et al. |
| 2017/0104263 A1 | 4/2017 | Hosseini |
| 2017/0110888 A1 | 4/2017 | Leabman |
| 2017/0110889 A1 | 4/2017 | Bell |
| 2017/0110914 A1 | 4/2017 | Bell |
| 2017/0127196 A1 | 5/2017 | Blum et al. |
| 2017/0134686 A9 | 5/2017 | Leabman |
| 2017/0141583 A1 | 5/2017 | Adolf et al. |
| 2017/0163076 A1 | 6/2017 | Park et al. |
| 2017/0168595 A1 | 6/2017 | Sakaguchi et al. |
| 2017/0179763 A9 | 6/2017 | Leabman |
| 2017/0179771 A1 | 6/2017 | Leabman |
| 2017/0187198 A1 | 6/2017 | Leabman |
| 2017/0187222 A1 | 6/2017 | Hosseini |
| 2017/0187223 A1 | 6/2017 | Hosseini |
| 2017/0187228 A1 | 6/2017 | Hosseini |
| 2017/0187248 A1 | 6/2017 | Leabman |
| 2017/0187422 A1 | 6/2017 | Hosseini |
| 2017/0214422 A1 | 7/2017 | Na et al. |
| 2017/0338695 A1 | 11/2017 | Port |
| 2018/0040929 A1 | 2/2018 | Chappelle |
| 2018/0048178 A1 | 2/2018 | Leabman |
| 2018/0123400 A1 | 5/2018 | Leabman |
| 2018/0131238 A1 | 5/2018 | Leabman |
| 2018/0159338 A1 | 6/2018 | Leabman et al. |
| 2018/0159355 A1 | 6/2018 | Leabman |
| 2018/0166924 A1 | 6/2018 | Hosseini |
| 2018/0166925 A1 | 6/2018 | Hosseini |
| 2018/0198199 A1 | 7/2018 | Hosseini |
| 2018/0205232 A1 | 7/2018 | Leabman et al. |
| 2018/0212454 A1 | 7/2018 | Leabman |
| 2018/0212474 A1 | 7/2018 | Hosseini |
| 2018/0226840 A1 | 8/2018 | Leabman |
| 2018/0241255 A1 | 8/2018 | Leabman |
| 2018/0248409 A1 | 8/2018 | Johnston |
| 2018/0254639 A1 | 9/2018 | Bell |
| 2018/0262014 A1 | 9/2018 | Bell |
| 2018/0262040 A1 | 9/2018 | Contopanagos |
| 2018/0262060 A1 | 9/2018 | Johnston |
| 2018/0269570 A1 | 9/2018 | Hosseini |
| 2018/0287431 A1 | 10/2018 | Liu et al. |
| 2018/0331429 A1 | 11/2018 | Kornaros |
| 2018/0331581 A1 | 11/2018 | Hosseini |
| 2018/0337534 A1 | 11/2018 | Bell et al. |
| 2018/0375340 A1 | 12/2018 | Bell et al. |
| 2018/0375368 A1 | 12/2018 | Leabman |
| 2018/0376235 A1 | 12/2018 | Leabman |
| 2019/0052115 A1 | 2/2019 | Hosseini |
| 2019/0074133 A1 | 3/2019 | Contopanagos |
| 2019/0074728 A1 | 3/2019 | Leabman |
| 2019/0131827 A1 | 5/2019 | Johnston |
| 2019/0173323 A1 | 6/2019 | Hosseini |

FOREIGN PATENT DOCUMENTS

| | | |
|---|---|---|
| CN | 203826555 U | 9/2014 |
| CN | 104090265 A | 10/2014 |
| CN | 103380561 B | 9/2017 |
| DE | 200216655 U1 | 2/2002 |
| EP | 1028482 A2 | 8/2000 |
| EP | 1081506 A1 | 3/2001 |
| EP | 2397973 A1 | 6/2010 |
| EP | 2346136 A1 | 7/2011 |
| EP | 2545635 A2 | 1/2013 |
| EP | 2747195 A1 | 6/2014 |
| EP | 3067983 A1 | 9/2016 |
| EP | 3145052 A1 | 3/2017 |
| GB | 2404497 A | 2/2005 |
| JP | 2002319816 A | 10/2002 |
| JP | 2006157586 A | 6/2006 |
| JP | 2007043432 A | 2/2007 |
| JP | 2008167017 A | 7/2008 |
| JP | 2013162624 A | 8/2013 |
| JP | 2015128349 A | 7/2015 |
| JP | WO2015177859 A1 | 4/2017 |
| KR | 20060061776 A | 6/2006 |
| KR | 20070044302 A | 4/2007 |
| KR | 100755144 B1 | 9/2007 |

(56) References Cited

FOREIGN PATENT DOCUMENTS

| | | |
|---|---|---|
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| WO | WO 199508125 A1 | 3/1995 |
| WO | WO 1998/31070 A1 | 7/1998 |
| WO | WO 9952173 | 10/1999 |
| WO | WO 200111716 A1 | 2/2001 |
| WO | WO 2003091943 A1 | 11/2003 |
| WO | WO 2004077550 A1 | 9/2004 |
| WO | WO 2006122783 | 11/2006 |
| WO | WO 2007070571 A2 | 6/2007 |
| WO | WO 2008024993 A2 | 2/2008 |
| WO | WO 2008156571 A2 | 12/2008 |
| WO | WO 2010022181 A1 | 2/2010 |
| WO | WO 2010039246 A1 | 4/2010 |
| WO | WO 2010138994 A1 | 12/2010 |
| WO | WO 2011112022 A2 | 9/2011 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014134996 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015161323 A1 | 10/2015 |
| WO | WO 2016024869 A1 | 2/2016 |
| WO | WO 2016048512 A1 | 3/2016 |
| WO | WO 2016187357 A1 | 11/2016 |

OTHER PUBLICATIONS

Energous Corp., ISRWO, PCT/US2018/064289, dated Mar. 28, 2019, 14 pgs.
Energous Corp., ISRWO, PCT/US2018/031786, dated Aug. 8, 2018, 9 pgs.
Energous Corp., ISRWO, PCT/US2019/021817, dated Apr. 6, 2019, 11 pgs.
Energous Corp., Supplemntary European Search Report EP16880153.8, dated Jul. 2, 2019, 9 pgs.
Energous Corp., Supplementary European Search Report. EP17840412.5, dated Jul. 15, 2019, 8 pgs.
Energous Corp., Supplementary European Search Report. EP16880139-7, dated Jul. 12, 2019, 5 pgs.
Energous Corp., Supplementary European Search Report. EP16880158-7, dated Jul. 15, 2019, 5 pgs.
Energous Corp., Supplementary European Search Report. EP16882696-4, dated Jul. 3, 2019, 10 pgs.
Energous Corp., ISRWO, PCT/US2014/037170, dated Sep. 15, 2014, 11 pgs.
Energous Corp., IPRP, PCT/US2014/037170, dated Nov. 10, 2015, 8 pgs.
Energous Corp., ISRWO, PCT/US2014/041534, dated Oct. 13, 2014, 10 pgs.
Energous Corp., IPRP, PCT/US2014/041534, dated Dec. 29, 2015, 7 pgs.
Energous Corp., ISRWO, PCT/US2014/046956, dated Nov. 12, 2014, 10 pgs.
Energous Corp., IPRP, PCT/US2014/046956, dated Jan. 19, 2016, 7 pgs.
Energous Corp., ISRWO, PCT/US2014/037072, dated Sep. 12, 2014 8 pgs.
Energous Corp., IPRP, PCT/US2014/037072, dated Nov. 10, 2015, 6 pgs.
Energous Corp., ISRWO, PCT/US2014/068568, dated Mar. 20, 2015, 10 pgs.
Energous Corp., IPRP, PCT/US2014/068568, dated Jun. 14, 2016, 8 pgs.
Energous Corp., ISRWO, PCT/US2014/055195, dated Dec. 22, 2014, 11 pgs.
Energous Corp., IPRP, PCT/US2014/055195, dated Mar. 22, 2016, 9 pgs.
Energous Corp., ISRWO, PCT/US2015/067291, dated Mar. 4, 2016, 10 pgs.
Energous Corp., IPRP, PCT/US2015/067291, dated Jul. 4, 2017, 4 pgs.
Energous Corp., ISRWO, PCT/US2015/067242, dated Mar. 16, 2016, 9 pgs.
Energous Corp., IPRP, PCT/US2015/067242, dated Jun. 27, 2017, 7 pgs.
Energous Corp., ISRWO, PCT/US2015/067243, dated Mar. 10, 2016, 11 pgs.
Energous Corp., IPRP, PCT/US2015/067243, dated Jun. 27, 2017, 7 pgs.
Energous Corp., ISRWO, PCT/US2014/037109, dated Apr. 8, 2016, 12 pgs.
Energous Corp., IPRP, PCT/US2014/037109, dated Apr. 12, 2016, 9 pgs.
Energous Corp., ISRWO, PCT/US2015/067275, dated Mar. 3, 2016, 8 pgs.
Energous Corp., IPRP, PCT/US2015/067275, dated Jul. 4, 2017, 7 pgs.
Energous Corp., ISRWO, PCT/US2015/067245, dated Mar. 17, 2016, 8 pgs.
Energous Corp., IPRP, PCT/US2015/067245, dated Jun. 27, 2017, 7 pgs.
Energous Corp., ISRWO, PCT/US2014/041546, dated Oct. 16, 2014, 12 pgs.
Energous Corp., IPRP, PCT/US2014/041546, dated Dec. 29, 2015, 9 pgs.
Energous Corp., ISRWO, PCT/US2015/67250, dated Mar. 30, 2016, 11 pgs.
Energous Corp., IPRP, PCT/US2015/67250, dated Mar. 30, 2016, 10 pgs.
Energous Corp., ISRWO, PCT/US2015/067325, dated Mar. 10, 2016, 9 pgs.
Energous Corp., IPRP, PCT/US2015/067325, dated Jul. 4, 2017, 8 pgs.
Energous Corp., ISRWO, PCT/US2014/040697, dated Oct. 1, 2014, 12 pgs.
Energous Corp., IPRP, PCT/US2014/040697, dated Dec. 8, 2015, 9 pgs.
Energous Corp., ISRWO, PCT/US2014/040705, dated Sep. 23, 2014, 8 pgs.
Energous Corp., IPRP, PCT/US2014/040705, dated Dec. 8, 2015, 6 pgs.
Energous Corp., ISRWO, PCT/US2015/067249, dated Mar. 29, 2016, 8 pgs.
Energous Corp., IPRP, PCT/US2015/067249, dated Jun. 27, 2017, 7 pgs.
Energous Corp., ISRWO, PCT/US2015/067246, dated May 11, 2016, 18 pgs.
Energous Corp., IPRP, PCT/US2015/067246, dated Jun. 27, 2017, 9 pgs.
Energous Corp., ISRWO, PCT/US2014/059317, dated Feb. 24, 2015, 13 pgs.
Energous Corp., IPRP, PCT/US2014/059317, dated Apr. 12, 2016, 10 pgs.
Energous Corp., ISRWO, PCT/US2014/049669, dated Nov. 13, 2014, 10 pgs.
Energous Corp., IPRP, PCT/US2014/049669, dated Feb. 9, 2016, 8 pgs.
Energous Corp., ISRWO, PCT/US2014/041323, dated Oct. 1, 2014, 10 pgs.

(56) References Cited

OTHER PUBLICATIONS

Energous Corp., IPRP, PCT/US2014/041323, dated Dec. 22, 2015, 8 pgs.
Energous Corp., ISRWO, PCT/US2014/048002, dated Nov. 13, 2014, 11 pgs.
Energous Corp., IPRP, PCT/US2014/048002, dated Feb. 12, 2015 8 pgs.
Energous Corp., ISRWO, PCT/US2014/062682, dated Feb. 12, 2015, 10 pgs.
Energous Corp., IPRP, PCT/US2014/062682, dated May 3, 2016, 8 pgs.
Energous Corp., ISRWO, PCT/US2014/049666, dated Nov. 10, 2014, 7 pgs.
Energous Corp., IPRP, PCT/US2014/049666, dated Feb. 9, 2016, 5 pgs.
Energous Corp., ISRWO, PCT/US2014/046961, dated Nov. 24, 2014, 16 pgs.
Energous Corp., IPRP, PCT/US2014/046961, dated Jan. 19, 2016, 8 pgs.
Energous Corp., ISRWO, PCT/US2015/067279, dated Mar. 11, 2015, 13 pgs.
Energous Corp., IPRP, PCT/US2015/067279, dated Jul. 4, 2017, 7 pgs.
Energous Corp., ISRWO, PCT/US2014/041342, dated Jan. 27, 2015, 10 pgs.
Energous Corp., IPRP, PCT/US2014/041342, dated Dec. 15, 2015, 8 pgs.
Energous Corp., ISRWO, PCT/US2014/046941, dated Nov. 6, 2014, 11 pgs.
Energous Corp., IPRP, PCT/US2014/046941, dated Jan. 19, 2016, 9 pgs.
Energous Corp., ISROWO, PCT/US2014/062661, dated Jan. 27, 2015, 12 pgs.
Energous Corp., IPRP, PCT/US2014/062661, dated May 3, 2016, 10 pgs.
Energous Corp., ISRWO, PCT/US2014/059871, dated Jan. 23, 2015, 12 pgs.
Energous Corp., IPRP, PCT/US2014/059871, dated Apr. 12, 2016, 9 pgs.
Energous Corp., ISRWO, PCT/US2014/045102, dated Oct. 28, 2014, 14 pgs.
Energous Corp., IPRP, PCT/US2014/045102, dated Jan. 12, 2016, 11 pgs.
Energous Corp., ISRWO, PCT/US2014/059340, dated Jan. 15, 2015, 13 pgs.
Energous Corp., IPRP, PCT/US2014/059340, dated Apr. 12, 2016, 11 pgs.
Energous Corp., ISRWO, PCT/US2015/067282, dated Jul. 5, 2016, 7 pgs.
Energous Corp., IPRP, PCT/US2015/067282, dated Jul. 4, 2017, 6 pgs.
Energous Corp., ISRWO, PCT/US2014/041558, dated Oct. 10, 2014, 8 pgs.
Energous Corp., IPRP, PCT/US2014/041558, dated Dec. 29, 2015, 6 pgs.
Energous Corp., ISRWO, PCT/US2014/045119, dated Oct. 13, 2014, 11 pgs.
Energous Corp., IPRP, PCT/US2014/045119, dated Jan. 12, 2016, 9 pgs.
Energous Corp., ISRWO PCT/US2014/045237, dated Oct. 13, 2014, 16 pgs.
Energous Corp., IPRP, PCT/US2014/045237, dated Jan. 12, 2016, 12 pgs.
Energous Corp., ISRWO, PCT/US2014/054897, dated Feb. 17, 2015, 10 pgs.
Energous Corp., IPRP, PCT/US2014/054897, dated Mar. 15, 2016, 8 pgs.
Energous Corp., ISRWO, PCT/US2015/067334, dated Mar. 3, 2016, 6 pgs.
Energous Corp., IPRP, PCT/US2015/067334, dated Jul. 4, 2017, 5 pgs.
Energous Corp., ISRWO, PCT/US2014/047963, dated Nov. 7, 2014, 13 pgs.
Energous Corp., IPRP, PCT/US2014/047963, dated Jan. 26, 2016, 10 pgs.
Energous Corp., ISRWO, PCT/US2014/054891, dated Dec. 18, 2014, 12 pgs.
Energous Corp., IPRP, PCT/US2014/054891, dated Mar. 15, 2016, 10 pgs.
Energous Corp., ISRWO, PCT/US2014/054953, dated Dec. 4, 2014, 7 pgs.
Energous Corp., IPRP, PCT/US2014/054953, dated Mar. 22, 2016, 5 pgs.
Energous Corp., ISRWO, PCT/US2015/067294, dated Mar. 29, 2016, 7 pgs.
Energous Corp., IPRP, PCT/US2015/067294, dated Jul. 4, 2017, 6 pgs.
Energous Corp., ISRWO, PCT/US2014/062672 dated Jan. 26, 2015, 11 pgs.
Energous Corp., IPRP, PCT/US2014/062672 dated May 10, 2016, 8 pgs.
Energous Corp., ISRWO, PCT/US2016/069313 dated Nov. 13, 2017, 10 pgs.
Energous Corp., IPRP, PCT/US2016/069313 dated Jul. 3, 2018, 7 pgs.
Energous Corp., ISRWO, PCT/US2014/044810 dated Oct. 21, 2014, 12 pgs.
Energous Corp., IPRP, PCT/US2014/044810, dated Jan. 5, 2016, 10 pgs.
Energous Corp., ISRWO, PCT/US2015/067271, dated Mar. 11, 2016, 6 pgs.
Energous Corp., IPRP, PCT/US2015/067271, dated Jul. 4, 2017, 5 pgs.
Energous Corp., ISRWO, PCT/US2014/040648, dated Oct. 10, 2014, 11 pgs.
Energous Corp., IPRP, PCT/US2014/040648, dated Dec. 8, 2015, 8 pgs.
Energous Corp., ISRWO, PCT/US2014/049673, dated Nov. 18, 2014, 10 pgs.
Energous Corp., IPRP, PCT/US2014/049673, dated Feb. 9, 2016, 6 pgs.
Energous Corp., ISRWO, PCT/US2014/068282, dated Mar. 19, 2015, 13 pgs.
Energous Corp., IPRP, PCT/US2014/068282, dated Jun. 7, 2016, 10 pgs.
Energous Corp., ISRWO, PCT/US2014/068586, dated Mar. 20, 2015, 11 pgs.
Energous Corp., IPRP, PCT/US2014/068586, dated Jun. 14, 2016, 8 pgs.
Energous Corp., ISRWO, PCT/US2016/068504, dated Mar. 30, 2017, 8 pgs.
Energous Corp., IPRP, PCT/US2016/068504, dated Jun. 26, 2018, 5 pgs.
Energous Corp., ISRWO, PCT/US2016/068495, dated Mar. 30, 2017, 9 pgs.
Energous Corp., IPRP, PCT/US2016/068495, dated Jun. 26, 2018, 7 pgs.
Energous Corp., ISRWO, PCT/US2015/067287, dated Feb. 2, 2016, 8 pgs.
Energous Corp., IPRP, PCT/US2015/067287, dated Jul. 4, 2017, 6 pgs.
Energous Corp., ISRWO, PCT/US2016/068551, dated Mar. 17, 2017, 8 pgs.
Energous Corp., IPRP, PCT/US2016/068551, dated Jun. 26, 2018, 6 pgs.
Energous Corp., ISRWO, PCT/US2016/068498, dated May 17, 2017, 8 pgs.
Energous Corp., IPRP, PCT/US2016/068498, dated Jun. 26, 2018, 6 pgs.
Energous Corp., ISRWO, PCT/US2016/068993, dated Mar. 13, 2017, 12 pgs.

(56) References Cited

OTHER PUBLICATIONS

Energous Corp., IPRP, PCT/US2016/068993, dated Jul. 3, 2018, 10 pgs.
Energous Corp., ISRWO, PCT/US2016/068565, dated Mar. 8, 2017, 11 pgs.
Energous Corp., IPRP, PCT/US2016/068565, dated Jun. 26, 2018, 9 pgs.
Energous Corp., ISRWO, PCT/US2016/068987, dated May 8, 2017, 10 pgs.
Energous Corp., IPRP, PCT/US2016/068987, dated Jul. 3, 2018, 7 pgs.
Energous Corp., ISRWO, PCT/US2016/069316 , dated Mar. 16, 2017, 15 pgs.
Energous Corp., IPRP, PCT/US2016/069316 , dated Jul. 3, 2018, 12 pgs.
Energous Corp., ISRWO, PCT/US2018/012806 , dated Mar. 23, 2018, 9 pgs.
Energous Corp., ISRWO, PCT/US2017/046800, dated Sep. 11, 2017, 13 pgs.
Energous Corp., IPRP, PCT/US2017/046800, dated Feb. 12, 2019, 10 pgs.
Energous Corp., ISRWO, PCT/US2017/065886, dated Apr. 6, 2018, 13 pgs.
Energous Corp., ISRWO, PCT/US2018/031768, dated Jul. 3, 2018, 9 pgs.
Energous Corp., ISRWO, PCT/US2018/0351082, dated Dec. 12, 2018, 9 pgs.
Order Granting Reexamination Request Control No. 90013793 Aug. 31, 2016, 23 pgs.
*Ossia Inc.* vs *Energous Corp.*, PGR2016-00023—Institution Decision, Nov. 29, 2016, 29 pgs.
*Ossia Inc.* vs *Energous Corp.*, PGR2016-00024—Institution Decision, Nov. 29, 2016, 50 pgs.
*Ossia Inc.* vs *Energous Corp.*, PGR2016-00024—Judgement—Adverse, Jan. 20, 2017, 3 pgs.
ReExam Ordered Control No. 90013793 Feb. 2, 2017, 8 pgs.
*Ossia Inc.* vs *Energous Corp.*, Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.*, Petition for Post-Grant Review of U.S. Pat. No. 9,124,125, May 31, 2016, 92 pgs.
*Ossia Inc.* vs *Energous Corp.*, Patent Owner Preliminary Response, dated Sep. 8, 2016, 95 pgs.
*Ossia Inc.* vs *Energous Corp.*, Petition for Post Grant Review of U.S. Pat. No. 9,124,125, May 31, 2016, 86 pgs.
*Ossia Inc.* vs *Energous Corp.*, Declaration of Stephen B. Heppe in Support of Petition for Post-Grant Review of U.S. Pat. No. 9,124,125, PGR2016-00023, May 31, 2016, 144 pgs.
Supplementary European Search Report, EP Patent Application No. EP14818136-5, dated Jul. 21, 2016, 9 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017, 7 pgs.
European Search Report, EP Patent Application No. 16189300, dated Feb. 28, 2017, 4 pgs.
European Search Report, EP Patent Application No. 16189988.5, dated Mar. 1, 2017, 4 pgs.
European Search Report, EP Patent Application No. 16189982.8, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2017, 5 pgs.
European Search Report, EP Patent Application No. 14868901.1, dated Jul. 7, 2017, 5 pgs.
European Search Report. EP15876036, dated May 3, 2018, 8 pgs.
Supplemental European Search Report. EP15874273.4, dated May 11, 2018, 7 pgs.
Supplemental European Search Report. EP15876033.0, dated Jun. 13, 2018, 10 pgs.
Supplemental European Search Report. EP15876043.9, dated Aug. 8, 2018, 9 pgs.
Extended European Search Report, EP18204043.6, dated Feb. 14, 2019, 5 pgs.
L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.
Singh, Wireless Power Transfer Using Metamaterial Bonded Microstrip Antenna for Smart Grid Wsn: In Fourth International Conference on Advances in Computing and Communications (ICACC), Aug. 27-29, 2014, Abstract 299.
T. Gill et al. "A System for Change Detection and Human Recognition in Voxel Space using the Microsoft Kinect Sensor," 2011 IEEE Applied Imagery Pattern Recognition Workshop. 8 pgs.
J. Han et al. Enhanced Computer Vision with Microsoft Kinect Sensor: A Review, IEEE Transactions on Cybernetics vol. 43, No. 5. pp. 1318-1334, Oct. 3, 2013.
Zhai, "A Practical wireless charging system based on ultra-wideband retro-reflective beamforming" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA Jun. 19-24 1994. Abstract 3 pgs.
Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.
Adamiuk G et al; "Compact, Dual-Polarized UWB-Antanna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.
Mascarenas et al.; "Experimental Studies of Using Wireless Energy Transmission for Powering Embedded Sensor Nodes." Nov. 28, 2009, Journal of Sound and Vibration, pp. 2421-2433.
Li et al. High-Efficiency Switching-Mode Charger System Design Considerations with Dynamic Power Path Management, Mar./Apr. 2012 Issue, 8 pgs.

\* cited by examiner

WIRELESS CHARGING TRANSMITTERS THAT USE SENSOR DATA TO ADJUST TRANSMISSION OF POWER WAVES

CROSS-REFERENCES TO RELATED APPLICATIONS

This application is a continuation of U.S. patent application Ser. No. 14/757,568, filed on Dec. 24, 2015, entitled "Proximity transmitters for wireless power charging systems," which is hereby incorporated by reference in its entirety.

U.S. patent application Ser. No. 14/757,568 is a continuation-in-part of U.S. patent application Ser. No. 14/585,341, filed on Dec. 30, 2014, which is a continuation-in-part of U.S. patent application Ser. No. 13/939,706, filed on Jul. 11, 2013, each of which is hereby incorporated by reference in its respective entirety.

U.S. patent application Ser. No. 14/757,568 is also a continuation-in-part of U.S. patent application Ser. No. 14/861,285, filed on Sep. 22, 2015, which is hereby incorporated by reference in its entirety.

TECHNICAL FIELD

Generally, the present disclosure relates to wireless charging. More particularly, the present disclosure relates to wireless charging transmitters.

BACKGROUND

Electronic devices, such as laptop computers, smartphones, portable gaming devices, tablets, or others, require power to operate. This state of being may entail having to charge electronic equipment at least once a day, or in high-use or power-hungry electronic devices, more than once a day. Such activity may be tedious and may present a burden to some users. For example, a user may be required to carry chargers in case his electronic equipment is lacking power. In addition, some users have to find available power sources to connect to, which is time consuming. Lastly, some users must plug into a wall or some other power supply to be able to charge their electronic device. However, such activity may render electronic devices inoperable or not portable during charging.

Some conventional solutions include an inductive charging pad, which may employ magnetic induction or resonating coils. Nevertheless, such a solution may still require that electronic devices may have to be placed in a specific place on the inductive charging pad for powering. Therefore, electronic devices may not sufficiently charge or may not receive a charge if not oriented properly on the inductive charging pad.

Accordingly, there is a desire for a charging pad with that allows for wireless charging without requiring a particular orientation and providing a sufficient charge. As such, what is needed is a means for transmitting energy through an alternative means for wireless power charging other than conventional magnetic induction. Consequently, what is needed are systems and methods for transmitting energy through waveforms of various types.

SUMMARY

Disclosed herein are systems and methods addressing the shortcomings in the art, and may also provide additional or alternative advantages as well. The embodiments described herein provide a wireless charging proximity transmitter configured to intelligently generate and transmit waveforms of various types, such as radio-frequency waves and ultrasound waves, among others. The wireless charging transmitter may be used for providing energy to a receiver that is proximately located to the transmitter. The receiver may be associated with, coupled to, and/or may be a component of, an electrical device that is intended to receive the power from the wave-based energy produced by the wireless proximity transmitter for operating the electrical device and/or charging its battery.

In one embodiment, a wireless charging proximity transmitter comprises an array of one or more antennas; and a surface layer proximate to the array of antennas, wherein the transmitter is configured to transmit one or more power waves to a receiver in response to a device associated with the receiver being within a proximity threshold of the surface layer of the proximity transmitter. Depending on the distance of the surface layer from the array of antennas and on other system parameters, the waves may exhibit varying levels of convergence. For example the waves may converge to form a pocket of energy at the surface layer, or they may loosely converge to form a general area at or near the surface layer in which the power waves are present.

In another embodiment, a wireless charging proximity transmitter comprises a housing comprising: an upper surface layer; a lower surface layer; at least one side wall extending from the lower surface layer to the upper surface layer; an array of one or more antennas positioned between the lower surface layer and the upper surface layer; and a controller configured to transmit one or more power waves from the array of one or more antennas, the one or more power waves transmitted to converge at a location of a device associated with a receiver upon identifying the device within a proximity threshold from a portion of the upper surface layer of the proximity transmitter. Depending on the distance of the surface layer from the array of antennas and on other system parameters, the waves may exhibit varying levels of convergence. For example the waves may converge to form a pocket of energy at the surface layer, or they may loosely converge to form a general area at or near the surface layer in which the power waves are present.

In another embodiment, a transmitter device for wireless power charging, the transmitter comprising: an interface of a type of connection configured to couple to a computing device at a corresponding interface of the type of connection of the computing device, and to receive electrical current from the computing device via the corresponding interface of the computing device; and a first set of one or more antennas configured to transmit one or more power waves to the receiver when the device associated with the receiver is within a proximity threshold to the transmitter. Communications signals from the receiver indicating a location of the receiver with respect to the transmitter may indicate physical location, such as distance and direction, or relative location expressed in a coordinate system, or alternatively may indicate only proximity as may be expressed as distance, power level, or other measurement.

In another embodiment, a method of wireless charging, the method comprising: receiving, by a proximity transmitter comprising an interface configured to couple the proximity transmitter at a corresponding interface of a computing device, electric current from a computing device via a corresponding interface between the computing device and the interface transmitter device; and transmitting, by a first set of one or more antennas of the proximity transmitter, one or more power waves at a direction of a device associated with a receiver when the device associated with the receiver is a distance from the proximity transmitter satisfying a proximity threshold.

Numerous other aspects, features and benefits of the present disclosure may be made apparent from the following detailed description taken together with the drawing figures.

BRIEF DESCRIPTION OF THE DRAWINGS

Embodiments of the present disclosure are described by way of example with reference to the accompanying figures, which are schematic and may not be drawn to scale. Unless indicated as representing prior art, the figures represent aspects of the present disclosure.

DETAILED DESCRIPTION

Figure 1:
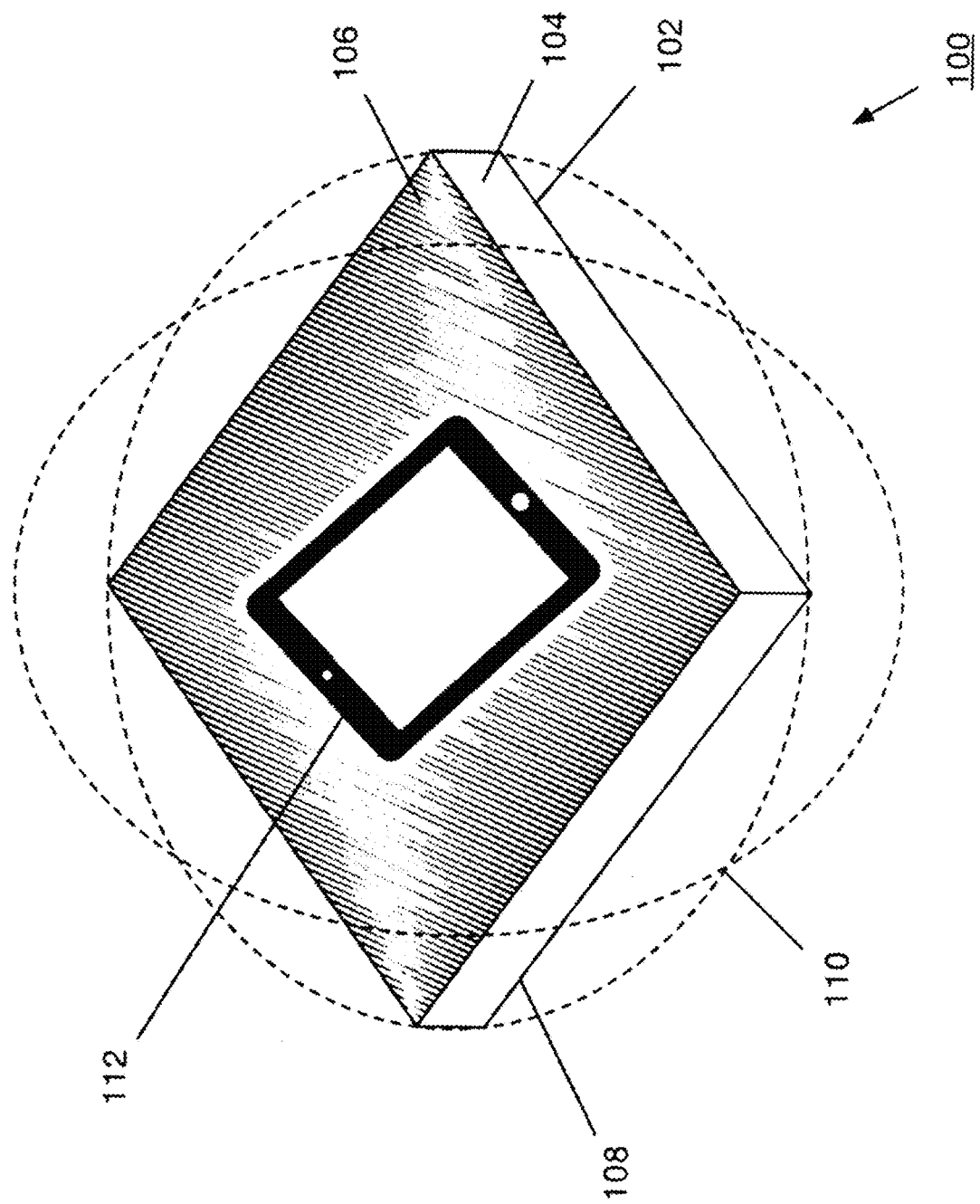
FIG. 1 illustrates a wireless charging proximity transmitter transmitting one or more power waves such that the one or more power waves converge in a three dimensional space to form one or more pockets of energy, in accordance with an embodiment of the present disclosure.

In the following detailed description, reference is made to the accompanying drawings, which form a part hereof. In the drawings, which may not be to scale or to proportion, similar symbols typically identify similar components, unless context dictates otherwise. The illustrative embodiments described in the detailed description, drawings and claims are not meant to be limiting. Other embodiments may be used and/or and other changes may be made without departing from the spirit or scope of the present disclosure.

FIG. 1 illustrates a proximity transmitter 100 transmitting one or more power waves such that the one or more power waves converge in a three dimensional space to form one or more pockets of energy, in accordance with an embodiment of the present disclosure. A proximity transmitter 100 comprises a housing 102 defined via a plurality of sidewalls 104, a top 106, and a bottom 108. The top 106 extends over the bottom 108. The sidewalls 104 span between the top 106 and the bottom 108. At least one of the sidewalls 104, the top 106, or the bottom 108 includes a surface layer, whether internal to the housing 102 or external to the housing 102. The surface layer may be any size. For example, the surface layer can be 6 inches in length, 1 inch in height, and 0.5 inch thick (6"×1"×0.5"), but nearly any other combination of sizes may possible. Moreover, the surface layer and other components of the proximity transmitter 100 can be of any shape or combination of shapes. For example, the surface layer or other component can be shaped as a rectangle, a triangle, a circle, an oval, a trapezoid, a parallelogram, or any other two dimensional (2D) shape. As another example, the top 106 can comprise an upper squared surface layer and the bottom 108 can having a rectangular shape that is comparatively broader and wider than the squared shape of the top 106.

The housing 102 comprises plastic, but can comprise at least one other material, whether additionally or alternatively, such as wood, metal, rubber, glass, or others. The housing 102 has a shape of a cube, but other shapes are possible, such as a cuboid, a sphere, a hemisphere, a dome, a cone, a pyramid, or any other polygonal shape, whether having an open-shape or a closed-shape. In some embodiments, the housing 102 is at least one of waterproof, water-repellant, or water-resistant.

The housing 102 houses various components of a transmitter 100, which transmits one or more controlled radio frequency (RF) waves in at least one direction. However, note that an omnidirectional transmission is possible as well. The RF waves may converge at a particular location in space. The RF waves may be controlled through phase and/or relative amplitude adjustments to form constructive and destructive interference patterns (pocket-forming) at specific locations in space. Accordingly, one or more pockets of energy 110 are generated by forming constructive interference patterns, whereas null-spaces may be generated by forming destructive interference patterns. Therefore, if a device 112 comprises a receiver, then the receiver may interface with the one or more pockets of energy 110 generated by the transmitter and thus effectively receive wireless power transmission from the transmitter 100.

The proximity transmitter 100 may transmit or broadcast power waves to the receiver associated with the device 112. Although some embodiments disclosed herein describe one or more power waves as radio frequency (RF) waves, power waves may be other types of waves capable of carrying energy, capable of being propagated through space, and capable of being converted into a source of electrical energy. The transmitter may transmit the power waves as a single collective of power waves directed at the receiver. In some embodiments, one or more transmitters may transmit a plurality of power waves that are propagated in multiple directions and may deflect off of physical obstructions, such as walls. The power waves may converge at a location in 3D space, forming the one or more pockets of energy 110. The receiver of the device 112, whether within a boundary of or via interfacing with the one or more pockets of energy 110, may capture and covert the power waves into a useable source of energy. The transmitter may control pocket-forming based on phase and/or relative amplitude adjustments of power waves, to form constructive interference patterns.

Depending on the distance of the surface layer from the antennas or array of antennas, as well as other potential system parameters, the power waves may exhibit varying levels of convergence, or sometime none at all. For example, the power waves may converge to form a pocket of energy 110 at the surface layer, or the power waves may loosely converge to form a general area at or near the surface layer in which the power waves are present. In some implementations, the device may receive a sufficient collection of waves directed at the receiver that the receiver may receive enough energy to charge the electronic device without requiring the power waves to form a constructive interference pattern or form a pocket of energy 110.

Although some embodiments recite a use of RF wave transmission techniques, the wireless charging techniques should not be limited to RF wave transmission techniques. Rather, possible wireless charging techniques may include any number of alternative or additional techniques for transmitting energy to a receiver converting the transmitted energy to electrical power. Non-limiting example transmission techniques for energy that can be converted by a receiving device into electrical power may include: ultrasound, microwave, laser light, infrared, or other forms of electromagnetic energy or non-electromagnetic energy. In the case of ultrasound, for example, one or more transducer elements may be disposed so as to form a transducer array that transmits ultrasound waves toward a receiving device that receives the ultrasound waves and converts them to electrical power. In addition, although a transmitter can be shown as a single unit comprising potentially multiple transmitters (transmit array), both for RF transmission of power and for other power transmission methods mentioned in this paragraph, the transmit arrays can comprise multiple transmitters that are physically spread around a room rather than being in a compact regular structure.

The transmitter includes an antenna array where the antennas are used for sending the power waves. The surface layer can be proximate to the array of antennas. For example, the array of antennas can be positioned between the lower rectangular surface layer and the upper rectangular surface layer and along a plane parallel to the lower rectangular surface and the upper rectangular surface. Each antenna sends power transmission waves where the transmitter applies a different phase and amplitude to the signal transmitted from different antennas. Similar to the formation of pockets of energy, the transmitter can form a phased array of delayed versions of the signal to be transmitted, apply different amplitudes to the delayed versions of the signal, and send the signals from appropriate antennas. For a sinusoidal waveform, such as an RF signal, ultrasound, microwave, or other periodic signal, delaying the signal is analogous to applying a phase shift to the signal.

The one or more pockets of energy 110 may be formed by creating constructive interference patterns of power waves transmitted by the transmitter. For example, the transmitter can be configured to transmit power waves which can converge in a constructive interference pattern at the surface layer of the housing 102. For example, the constructive interference pattern is formed at the surface layer of the housing 102 or the constructive interference pattern is formed proximate to the surface layer of the housing 102. The pockets of energy 110 may manifest from the constructive interference pattern as a three-dimensional field where energy may be harvested by the receiver located within the pocket of energy 110. The pocket of energy 110 produced by transmitter during pocket-forming may be harvested by the receiver, converted to an electrical current, and then provided to the device 112 associated with the receiver. In some embodiments, there may be multiple transmitters. In some embodiments, a subset of the antennas of the antenna array can transmit the power waves to a receiver on the surface layer of the housing 102. In some embodiments, the subset of the antennas of the array that transmit the power waves to the receiver on the surface layer of the housing 102 are directly below the receiver. In some embodiments, at least one antenna of the subset of the antennas of the array that transmit the power waves to the receiver on the surface layer of the housing 102 is not directly below the receiver. In some embodiments, the receiver is located externally to the device 112, and may be connected to the device 112 through one or more wires or otherwise attached to the device 112. For instance, the receiver may be situated in an external case that is permanently or removably attached to the device 112, thereby forming a connection with the device 112 that allows the device 112 to receive power from the receiver. Note that the power waves can comprise waves of various types, such as RF waves, ultrasound waves, microwaves, or others. In addition, in embodiments where RF waves are used, it should be appreciated that most any frequency for the waves may be used, including the range of roughly 900 MHz to roughly 100 GHz. For instance, one skilled in the art would appreciate that the power waves may be transmitted using nearly any industrial, scientific, and medical (ISM) radio band, such as 900 MHZ, 2.4 GHZ, 5 GHz, 24 GHz, or more.

Note that although the device 112 is a tablet computer, any type of any device, which comprises the receiver, can be placed on the housing 102. Further, note that although the device 112 is positioned centrally on the top 106 of the housing 102, the device 112 can be positioned anywhere on the housing 102 or in a local proximity of the housing 102, such as within about twelve (12) inches or less from the housing 102 in order to charge wirelessly. In some embodiments, the housing 102 comprises at least two transmitters.

Figure 2:
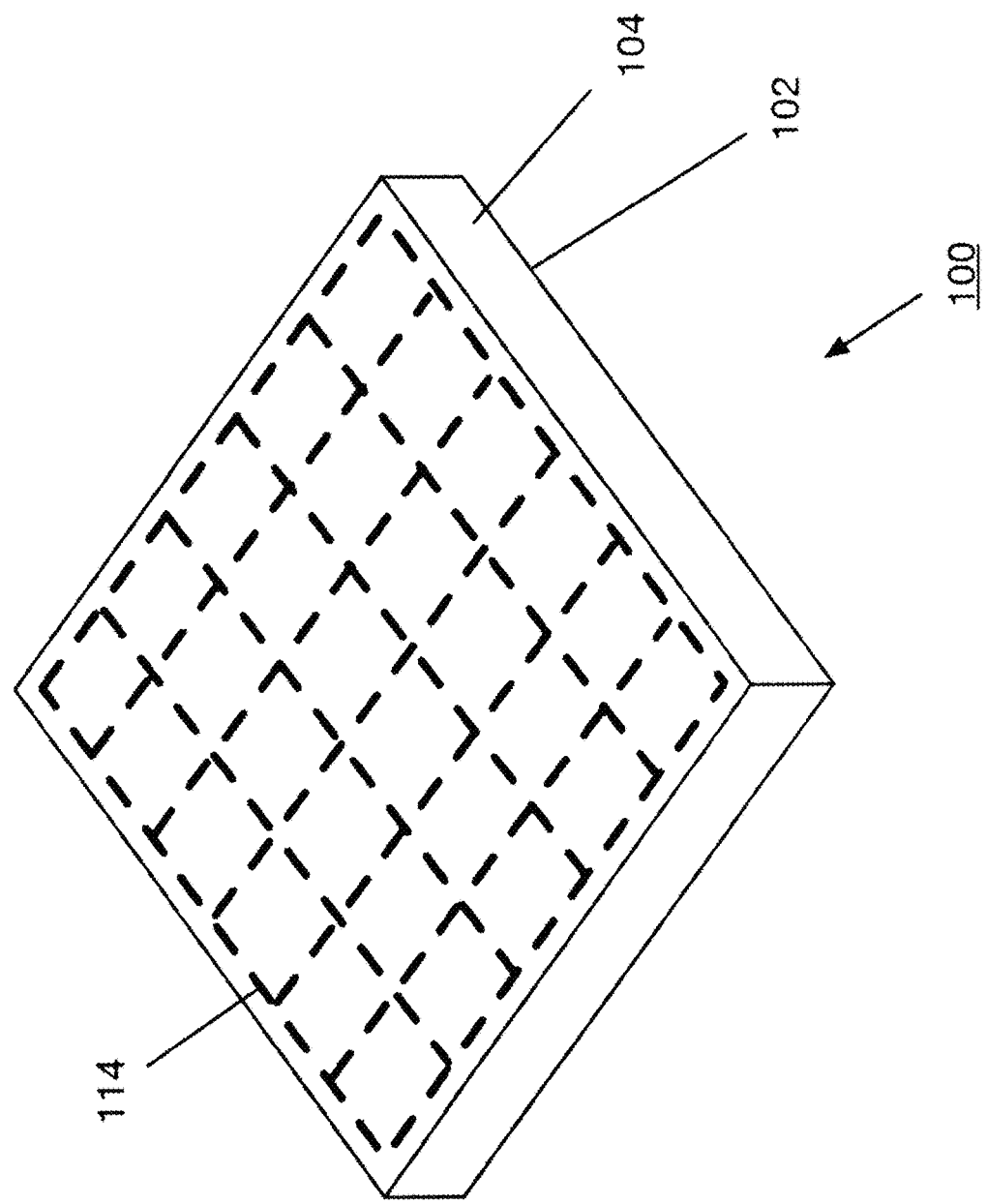
FIG. 2 illustrates a charging proximity transmitter comprising an antenna array positioned on a top of the proximity transmitter, in accordance with an embodiment the present disclosure.

FIG. 2 illustrates a proximity transmitter 100 comprising an antenna array positioned on a top of the proximity transmitter 100, in accordance with an embodiment the present disclosure. The top 106 comprises an array of antenna elements 114, which can operate as a single antenna. Note that the array of antenna elements 114 includes at least one antenna element, but array may comprise any number of antenna elements 114. The top 106 may comprise any number of arrays. In the exemplary embodiment, the top 106 comprises a single array of antenna elements 114. The array of antenna elements 114 may be embedded into the structure of the top 106 or may be coupled to the top 106, which can be accomplished through any permanent or removable means, such as mating or fastening. The array of antenna elements 114 are part of the transmitter 100, such that the array of antenna elements 114 transmit one or more RF waves, as described herein. In some embodiments, a transmitter 100 may comprise multiple physically distinct arrays of antenna elements 114, and may manage and feed power to each of the arrays. In yet other embodiments, the antenna elements may be located in, along, adjacent to or aligned with one or more sidewalls 104.

In operation, one or more pockets of energy 110 may be formed by creating constructive interference where the power transmission waves add constructively to form a pocket of energy within close proximity to the transmitter 100. In some instances, the proximity is such that the constructive interference patterns may not accumulate to form a pocket of energy. But in such instances, the proximity transmitter 100 may be configured to provide additional power waves to the receiver so that the receiver can receive and rectify enough energy for the electronic device coupled to the receiver. Through a separate communication channel from the power transmission waves, using any number of wireless communications protocols (e.g., Wi-Fi, Bluetooth®, ZigBee®) the receiver and transmitter 100 may continually communicate the power levels being received by the receiver and the power levels required by the electrical device, to continually adjust which, if any, of the antennas should be transmitting power waves and how much energy those waves should contain.

Around pockets of energy, or at particular locations in space where pockets of energy are undesired, the proximity transmitter 100 may generate and transmit power waves that result in one or more transmission nulls, which may be generated by creating destructive interference patterns. A transmission null in a particular physical location may refer to areas or regions of space where pockets of energy do not form because of destructive interference patterns of power transmission waves. In some embodiments, the housing 102 contains an interior space, where one or more antennas or antenna elements are positioned. In some embodiments, the array of antenna elements 114 can be at least partially invisible, such as via being positioned underneath an outermost surface of the top 106. However, in some embodiments, the array of antenna elements 114 can be at least partially visible, such as via being positioned on top of the outermost surface of the top 106.

Figure 3B:
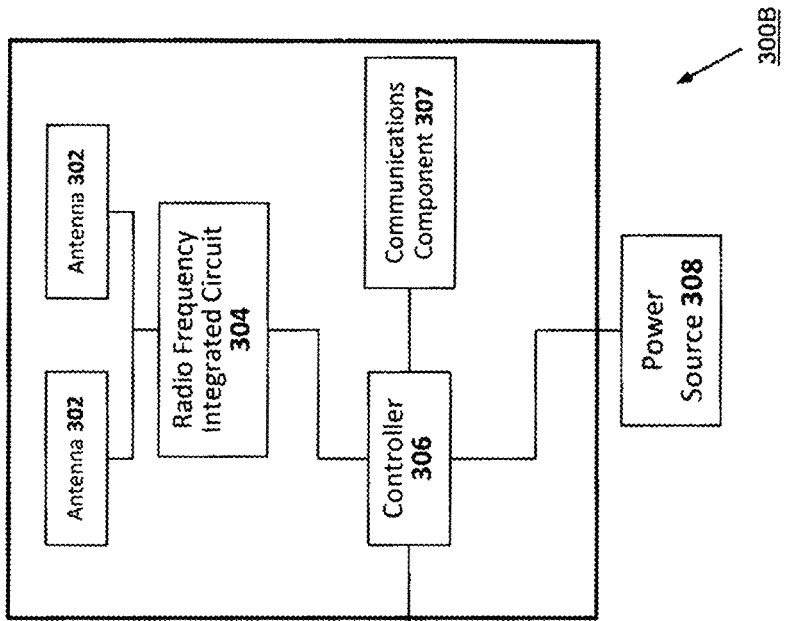
FIG. 3B illustrates a schematic diagram of a charging proximity transmitter with a sensor, in accordance with an embodiment of the present disclosure.
Figure 3A:
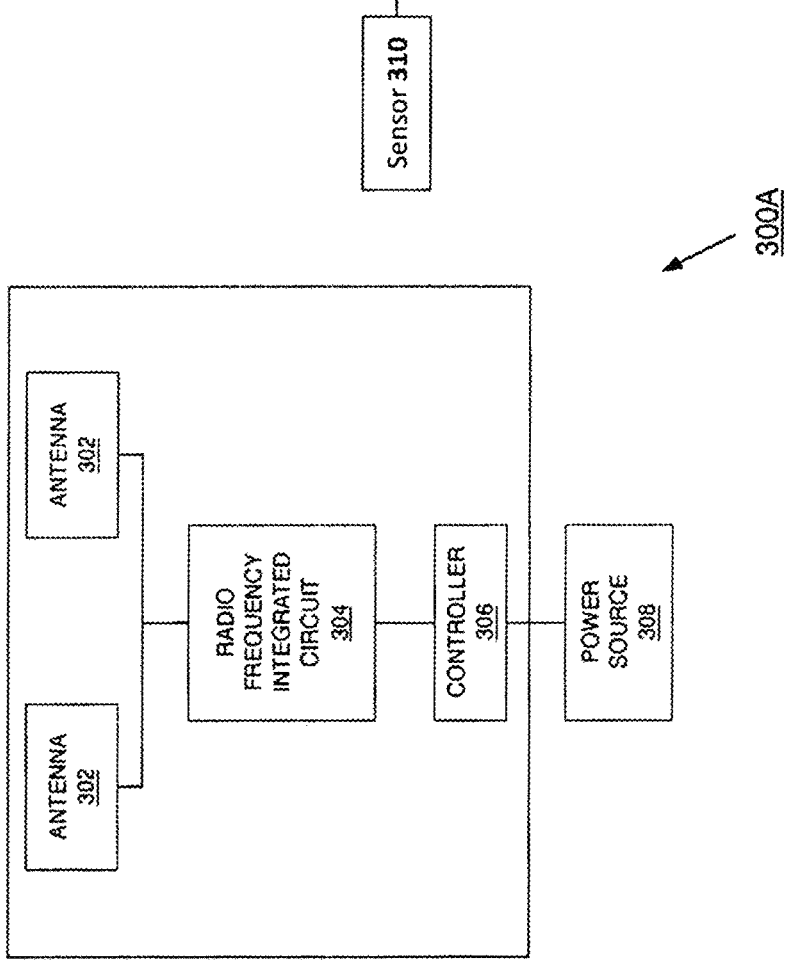
FIG. 3A illustrates a schematic diagram of a charging proximity transmitter, in accordance with an embodiment of the present disclosure.

FIG. 3A illustrates a schematic diagram of a proximity transmitter 300a, in accordance with an embodiment of the present disclosure. A schematic diagram depicts a proximity transmitter 300A capable of broadcasting wireless power waves, which may be RF waves, for wireless power transmission, as described herein. The transmitter 300A may be responsible for performing tasks related to transmitting power waves, which may include pocket-forming, adaptive pocket-forming, and multiple pocket-forming. The transmitter 300A includes one or more antenna elements 302, one or more RFICs 304, one or more controllers 306, and one or more power sources 308. The transmitter 300A can include a housing or an enclosure to house or enclose the one or more antenna elements 302, the one or more RFICs 304, and the one or more controllers 306. In some embodiments, the housing or the enclosure houses or encloses the one or more power sources 308. The housing or the enclosure can be made of any suitable material which may allow for signal or wave transmission and/or reception, for example plastic or hard rubber. The various components of the transmitter 300A may comprise, and/or may be manufactured using, meta-materials, micro-printing of circuits, nano-materials, and the like.

The one or more antenna elements 302 can be structured as the array of antenna elements 114, as described herein. At least one antenna element of the antenna elements 302 can be used to transmit one or more power waves. In some embodiments, all of the array of the antenna elements 114 is used to transmit one or more power waves.

The one or more RFICs 304 is configured to control production and transmission of the power waves based on information related to power transmission and pocket-forming. The one or more RFICs 304 may automatically adjust the phase and/or relative magnitudes of the power waves as needed. Pocket-forming is accomplished by the transmitter 300A transmitting the power waves in a manner that forms constructive interference patterns.

The one or more controllers 306 may comprise a processor running or having an ARM and/or a DSP architecture. ARM is a family of general purpose microprocessors based on a reduced instruction set computing (RISC). A digital signal processing (DSP) is a general purpose signal processing chip or technique which may provide a mathematical manipulation of an information signal to modify or improve the signal in some way, and can be characterized by the representation of discrete time, discrete frequency, and/or other discrete domain signals by a sequence of numbers or symbols and the processing of these signals. DSP may measure, filter, and/or compress continuous real-world analog signals. The first step may be conversion of the signal from an analog to a digital form, by sampling and then digitizing it using an analog-to-digital converter (ADC), which may convert the analog signal into a stream of discrete digital values. The one or more controllers 306 may also run Linux and/or any other operating system. The one or more controllers 306 may also be connected to Wi-Fi in order to provide information through a network.

The one or more controllers 306 may control a variety of features of the one or more RFICs 304, such as, time emission of pocket-forming, direction of the pocket-forming, bounce angle, power intensity and the like. Furthermore, the one or more controllers 306 may control multiple pocket-forming over multiple receivers or over a single receiver. For example, the controller 306 can be configured to transmit one or more power waves from the array of antennas that converges in a constructive interference pattern at the upper rectangular surface layer of the housing 102 of the proximity transmitter 100 upon a receiver being placed upon the upper rectangular surface layer. The proximity transmitter 300A may allow distance discrimination of wireless power transmission.

The one or more power sources 308 power the transmitter 300A. The one or more power sources 308 may include AC or DC power supply. Voltage, power, and current intensity provided by the one or more power sources 308 may vary in dependency with the required power to be transmitted. Conversion of power to radio signal may be managed by the one or more controller 306 and carried out by the one or more RFICs 304 that may utilize a plurality of methods and components to produce radio signals in a wide variety of frequencies, wavelength, intensities, and other features. As an illustrative use of a variety of methods and components for radio signal generation, oscillators and piezoelectric crystals may be used to create and change radio frequencies in different antenna elements 114. In addition, a variety of filters may be used for smoothing signals or for shaping frequency spectrum of the signal as well as amplifiers for increasing power to be transmitted. The transmitter 300A may emit RF power waves that are pocket-forming with a power capability from few watts to a predetermined number of watts required by a particular chargeable electronic device. Each antenna may manage a certain power capacity. Such power capacity may be related with the application. In some embodiments, the one or more power sources 308 may be a mechanical power source, such as a crank, a chemical power source, such as a battery, or an electrical power source, such as a capacitor or a photovoltaic cell. In some embodiments, the proximity transmitter 100 can be powered via mains electricity, such as via a power cord plugged into a wall outlet, which can be selectively detachable from the proximity transmitter 100 or be permanently attached to the proximity transmitter 100.

In one method of operation, the transmitter 300A may transmit or otherwise broadcast controlled RF waves that converge at a location in three-dimensional space, thereby forming the one or more pockets of energy 110. These RF waves may be controlled through phase and/or relative amplitude adjustments to form constructive or destructive interference patterns (i.e., pocket-forming). The one or more pockets of energy 110 may be two or three-dimensional fields that are created by forming constructive interference patterns; whereas transmission nulls may be a particular two or three-dimensional physical location that are generated by forming destructive interference patterns. Accordingly, a receiver may harvest electrical energy from the one or more pockets of energy 110 produced by pocket-forming for charging or powering a device coupled thereto.

In some embodiments, a communications component, as disclosed herein, is optional, but when used, the communication component is powered via the one or more power sources 308 and can be used to identify a location of the receiver, such as via communicating with the receiver, such as via a directional antenna. For example, the communications component can be a chip or circuitry configured to communicate over a short range communication protocol.

FIG. 3B illustrates a schematic diagram of a proximity transmitter 300B comprising or otherwise coupled to a communications component 307 and a sensor 310, in accordance with an embodiment of the present disclosure. One skilled in the art would appreciate that communications component 307 and the sensor 310 may be physically associated with the transmitter 300B in any number of combinations, as the communications component 307 and/or the sensor 310 may be connected to the proximity transmitter 300B, or may be an integrated component of the proximity transmitter 300B.

In some embodiments, the proximity transmitter 300B may comprise a communications component 307, which may include integrated circuits and antennas configured to allow the proximity transmitter 300B to communicate with receivers or other devices using any number of wired or wireless protocols. Non-limiting examples of wired communications may include Ethernet, USB, PCI, Firewire, and the like. Non-limiting examples of wireless protocols may include Wi-Fi, Bluetooth®, ZigBee®, NFC, RFID, and the like. In operation, the communications component 307 of the proximity transmitter 300B and a corresponding component of the receiver or electronic device may exchange communications signals containing operational data related to wireless charging and generating power waves, including operational instructions, measurements, and/or operational parameters. The controller 306 of the proximity transmitter 300B may determine various modes of operation and/or how to appropriately generate and transmit power waves based on the operational data received by the communications component 307 via the communications signals.

As an example, the communications component 307 of the proximity transmitter 300B may include a Bluetooth-enabled communications chip and antenna, which may communicate operational data with a receiver using communications signals conforming to Bluetooth® technology and protocols. In this example, the communications component 307 may detect the presence of the receiver based on Bluetooth-based data packets broadcasted by the receiver, or the receiver may transmit a "wake up" or "turn on" command to the proximity transmitter 300B, which is captured by the communications component 307 and send to the controller 306 of the proximity transmitter 300B which may in turn activate various power wave generate routines. A processor or other component of the proximity transmitter 300B may continuously monitor for signals triggering proximity transmitter 300B operation (e.g., "wake up" or "turn on" signals), or may periodically poll for such signals. As the proximity transmitter 300B may limit the distance at which the power waves may effectively charge the receiver, the communications component 307 may determine whether the receiver is within a threshold distance from the proximity transmitter 300B based on a signal strength of the communications signals or other parameters.

As another example, the communications component 307 of the proximity transmitter 300B may include a Bluetooth-enabled communications chip and antenna, which may communicate operational data with a receiver using communications signals conforming to Bluetooth® technology and protocols. In this example, the communications component 307 may receive a number of operational parameters, such as a signal strength of the communications signals received from the receiver or an amount of power (e.g., voltage) being received by the receiver, to determine a location of the receiver with respect to the proximity transmitter 300B. These values and/or the determined location of the receiver may then be used by the proximity transmitter 300B to determine which, if any, antennas 302 to activate, and/or the physical characteristics of the power waves (e.g., frequency, amplitude, power level).

The sensor 310 may receive raw sensor data from various types of sensors and then sends the sensor data to the one or more controllers 306 of the proximity transmitter 300B. In some implementations, the sensor 310 or related processor may execute a number of pre-processing routines on the raw sensor data. As such, the term "sensor data" may be used interchangeably with "raw sensor data" as it should be appreciated that the sensor data is not limited to raw sensor data and can include data that is processed by a processor associated with the sensor 310, processed by the transmitter 300B, or any other processor. The sensor data can include information derived from the sensor 310, and processed sensor data can include determinations based upon the sensor data.

In operation, the sensor data may help the transmitter 300B determine various modes of operation and/or how to appropriately generate and transmit power waves, so that the transmitter 300B may provide safe, reliable, and efficient wireless power to the receiver. As detailed herein, the sensor 310 may transmit sensor data collected during sensor operations for subsequent processing by a processor of the transmitter 300B. Additionally or alternatively, one or more sensor processors may be connected to or housed within the sensor 310. Sensor processors may comprise a microprocessor that executes various primary data processing routines, whereby the sensor data received at the transmitter processor has been partially or completely preprocessed as useable mapping data for generating power waves.

The sensor 310 can be optionally coupled to the one or more power sources 308. Alternatively or additionally, the sensor 310 can comprise a power source, such as a mechanical power source, such as a crank, a chemical power source, such as a battery, or an electrical power source, such as a capacitor or a photovoltaic cell. For example, the housing 102 can comprise the transmitter 300B, where the power source 308 is a first power source and the sensor 310 comprises a second power source, whether identical to or different from the first power source in power source manner, with the second power source being comprised in the housing 102, whether internal to or external to the transmitter 300B. Alternatively or additionally, the sensor 310 can operate without a power source, such as via being passive. However, note that the sensor 310 can be a passive sensor or an active sensor.

The sensor 310 can be positioned in any part or anywhere on or in the proximity transmitter 100, whether unitary to or assembled therewith. For example, the housing 102 comprises at least one of the interior space, the sidewall 104, the top 106, or the bottom 108, where at least one of the interior space, the sidewall 104, the top 106, or the bottom 108 comprises the sensor 310. Alternatively the sensor can be positioned outside the housing in another enclosure, and may be connected to the controller of the proximity transmitter 100 via a wired connection.

In some embodiments, the sensor 310 is configured to sense the device 112. Such sensing can be in the local proximity of the housing 102, such as within about twelve (12) inches or less from the housing 102. Accordingly, the sensor 310 can be a pressure sensor, a contact sensor, a thermal sensor, a static electricity sensor, a motion sensor, a magnetic sensor, or an electromagnetic spectrum sensor. Note that such listing is an example and other types of sensors can be used additionally or alternatively. For example, the sensor 310 can sense the device 112 placed on the housing 102 via a downward pressure of the device 112, such as via a weight of the device 112. For example, the sensor 310 can sense the device 112 via a contact of the device 112 with the housing 102. For example, the sensor 310 can sense the device 112 via a thermal signature or a thermal fingerprint from the device 112, such as via a heat emitted from a battery or a human hand heat remaining on the device 112 based on handling of the device 112. For example, the sensor 310 can sense a static electricity being emitted from or resulting from the device 112 being placed in proximity with or contacting the housing 102. For example, the sensor 310 can sense a motion of the device 312 with respect to the housing 102 or a motion resulting from the device 312 with respect to the housing 102. For example, the sensor 310 can sense the device 112 via an electromagnetic radiation being emitted from the device 112, such as a network signal, for instance a cellular signal, a Wi-Fi signal, a short range transmission protocol signal, or others. Note that a range of transmission of the transmitter 300B and a range of sensing of the sensor 310 can be identical to or different from each other, whether in a dependent or an independent manner. In some embodiments, the transmitter 300B is configured to transmit one or more power waves based at least in part on the sensor 310 sensing the device. For example, when the sensor 310 senses the device 112, the sensor 310 communicates such information to the controller 306, which in turn activates the one or more RFICs 304 to emit one or more power waves via the one or more antennas 302. For example, the transmitter 30013 can comprise a sensor configured to determine a presence of a receiver on the surface layer. For example, the transmitter 300B can be configured to transmit power waves upon a receiver being placed upon the surface layer of the housing 102, such via the sensor 310, which can sense or determine a presence of a receiver on the surface layer of the housing 102. Note that such sensing can occur without using the optional communications component, as disclosed herein.

In some embodiments the sensor may be configured to detect humans or other living beings such as pets by detecting the heat generated using thermal sensors. This information may be used by the controller in deciding whether to transmit power transmission waves, whether to lower the transmit power, or it may be used to generate pockets of energy away from the living being, and/or to generate transmission nulls in locations of living beings in order to avoid sensing electromagnetic waves to that location.

Other types or configurations of sensors that can be used herewith are more fully described in U.S. patent application Ser. No. 14/861,285, filed on Sep. 22, 2015, entitled "Systems and Methods for Identifying Sensitive Objects in a Wireless Charging Transmission Field," which is incorporated by reference herein in its entirety.

In some embodiments, the one or more controllers 306 can select which antenna elements in the array of antenna elements 302 will transmit one or more power waves, such as via smart dynamic antenna selection, such as based on distance, transmission quality, or others. For example, the one or more controllers 306 can select which antenna elements 302 will transmit one or more power waves based on information received from the sensor 310 or based on a detection of the receiver, such as via a placement of the receiver onto the housing 102. For example, such selection can be in an alternating manner, where a first antenna element is used and a second antenna element is not used, and then based on an occurrence of a certain condition, the first antenna element is not used, whereas the second antenna element is used.

Figures 4A, 4B:
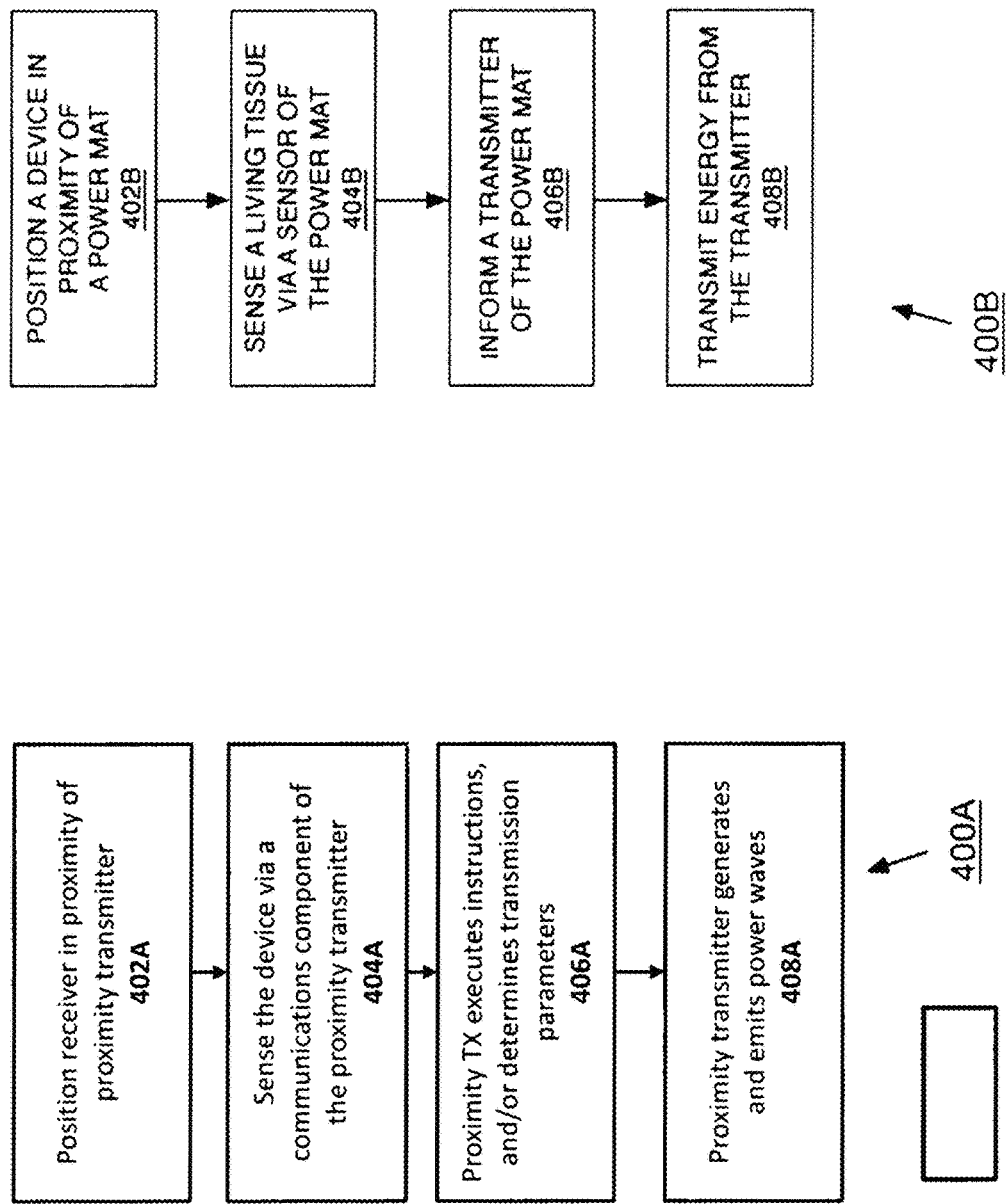
FIG. 4A illustrates a flowchart of a method of operating a charging proximity transmitter with a device sensor, in accordance with an embodiment of the present disclosure.
FIG. 4B illustrates a flowchart of a method of operating a charging proximity transmitter with a living tissue sensor, in accordance with an embodiment of the present disclosure.

FIG. 4A illustrates a flowchart of a method of operating a proximity transmitter with a device sensor, in accordance with an embodiment of the present disclosure. A method 400A comprises a plurality of blocks 402A-408A.

In block 402A, a receiver and associated electronic device may be positioned in proximity of the proximity transmitter. In some embodiments, proximity may include placing the receiver on top of, or otherwise in direct contact with, the proximity transmitter. And in some instances, proximity may include positioning the device within the local proximity of the proximity transmitter, such as within about twelve (12) inches of the proximity transmitter.

In block 404A, the communications component 307 of the proximity transmitter may detect that the device is nearby or approaching based on communications signals received through a wired or wireless connection. The communications component may then determine whether the to begin generating power waves, which antennas should generate the power waves, and/or the characteristics of the power waves. In some instances, the controller may use this data collected by the communications component to determine whether the receiver has entered a threshold distance to begin transmitting power waves. The controller may then determine which antennas are generally proximate to or in contact with the receiver and thus which antennas should be activated.

In block 406A, the proximity transmitter may execute one or more instructions and/or determines transmission parameters based on operation data received by the communications component, from the receiver. For example, after the communications component detects or otherwise receives a wirelessly broadcasted data packet from the receiver, the controller may automatically begin determining the location of the receiver, or may begin transmitting power waves. As another example, the proximity transmitter may begin determining the location of the receiver, or the distance of the receiver, based on the signal strength of the communications signals or other data reported from the receiver. The proximity transmitter may also begin determining the effective antennas and waveform characteristics to use when transmitting power waves to the receiver.

In block 408A, the transmitter transmits one or more power waves to the device based on the operational data or operational parameters received by the communications component.

FIG. 4B illustrates a flowchart of a method of operating a proximity transmitter with a living tissue sensor, in accordance with an embodiment of the present disclosure. A method 400A comprises a plurality of blocks 402A-408A.

In block 402B, the device is positioned in proximity of the proximity transmitter. Such positioning can be on the proximity transmitter 100 or in the local proximity of the proximity transmitter, such as within about twelve (12) inches of the proximity transmitter.

In block 404B, the sensor of the proximity transmitter senses the living beings. For example, the sensor can be a pressure sensor, a contact sensor, a thermal sensor, a static electricity sensor, a motion sensor, or an electromagnetic spectrum sensor.

In block 406B, the sensor informs the transmitter of a presence of the living beings. Such informing can be wired or wireless.

In block 408B, the transmitter controls the one or more RFICs 304 to emit away or around or in different direction or cease from emitting or not emit one or more power waves via the one or more antennas such that one or more power waves avoid the living beings. Therefore, the transmitter operates such that the one or more pockets of energy avoid the living beings based on being informed via the sensor.

Figure 5:
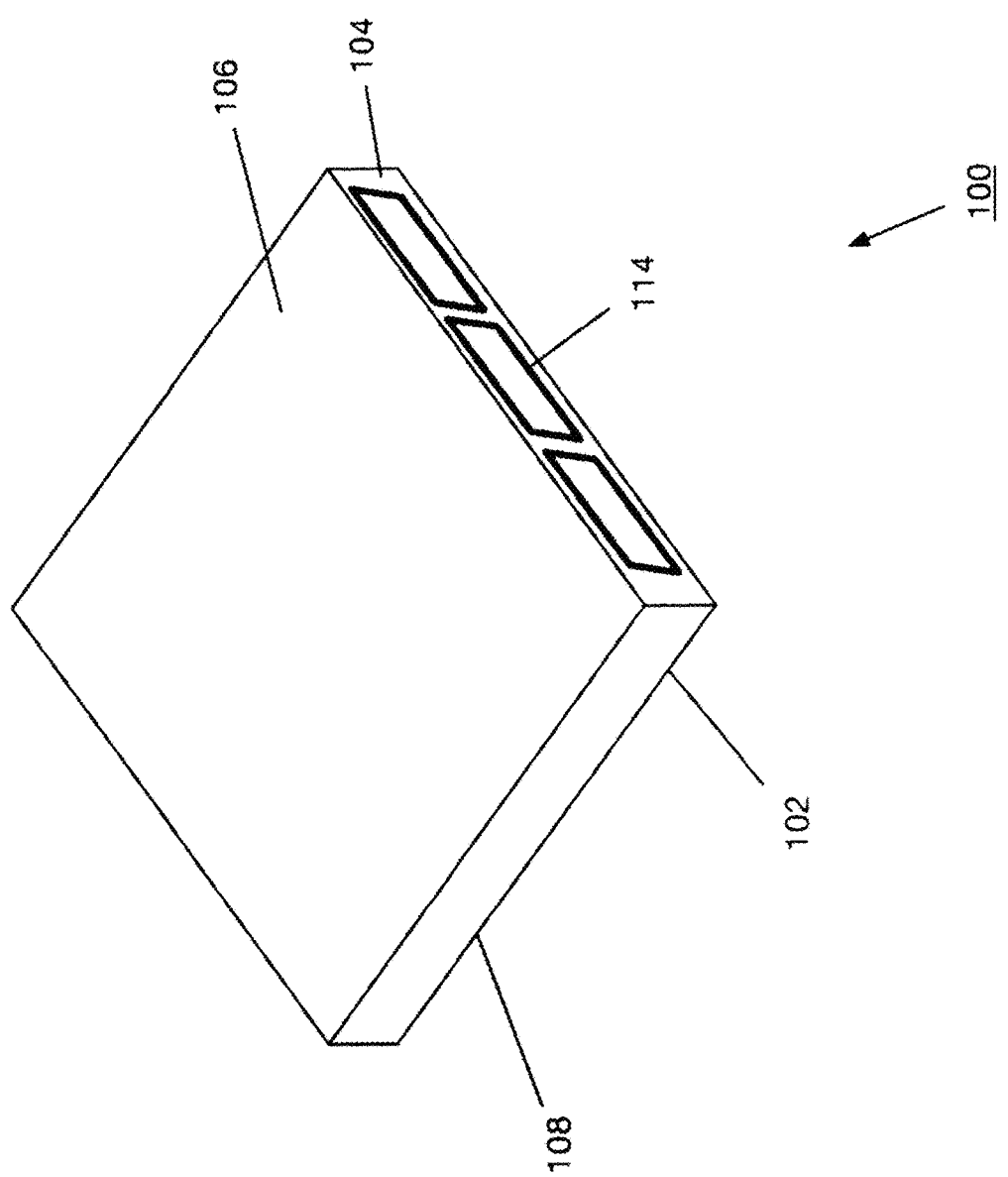
FIG. 5 illustrates a charging proximity transmitter comprising a sidewall with an antenna array, in accordance with an embodiment of the present disclosure.

FIG. 5 illustrates a proximity transmitter 100 comprising a sidewall 104 with an antenna array, in accordance with an embodiment of the present disclosure. The sidewall 104 of the housing 102 comprises the array of antenna elements 114, which can operate as a single antenna. Such configuration can be via the array of antenna elements 114 being embedded in the sidewall 104 or coupled to the sidewall 104, which can be removable, such as via mating or fastening. Note that more than one sidewall 104 can comprise the array of antenna elements 114, in any permutation or combination. For example, opposing or adjacent sidewalls 104 can comprise the array of antenna elements 114. The array of antenna elements 114 are part of the transmitter such that the array of antenna elements 114 transmit one or more RF waves, as described herein. The one or more pockets of energy 110 may be a 3D field of energy that are created by forming constructive interference patterns where the power transmission waves accumulate, around which one or more corresponding transmission null in a particular physical location may be generated by destructive interference patterns. A transmission null in a particular physical location may refer to areas or regions of space where pockets of energy do not form because of destructive interference patterns of power transmission waves.

In some embodiments, the bottom 108 of the housing 102 comprises the array of antenna elements 114, which can operate as a single antenna. Such configuration can be via the array of antenna elements 114 being embedded in the bottom 108 or coupled to the bottom 108, which can be removably, such as via mating or fastening.

In some embodiments, the array of antenna elements 114 can be at least partially invisible, such as via being positioned underneath an outermost surface of at least one of the bottom 108 or the sidewall 104. However, in some embodiments, the array of antenna elements 114 can be at least partially visible, such as via being positioned on top of the outermost surface of at least one of the bottom 108 or the sidewall 104.

Figure 6:
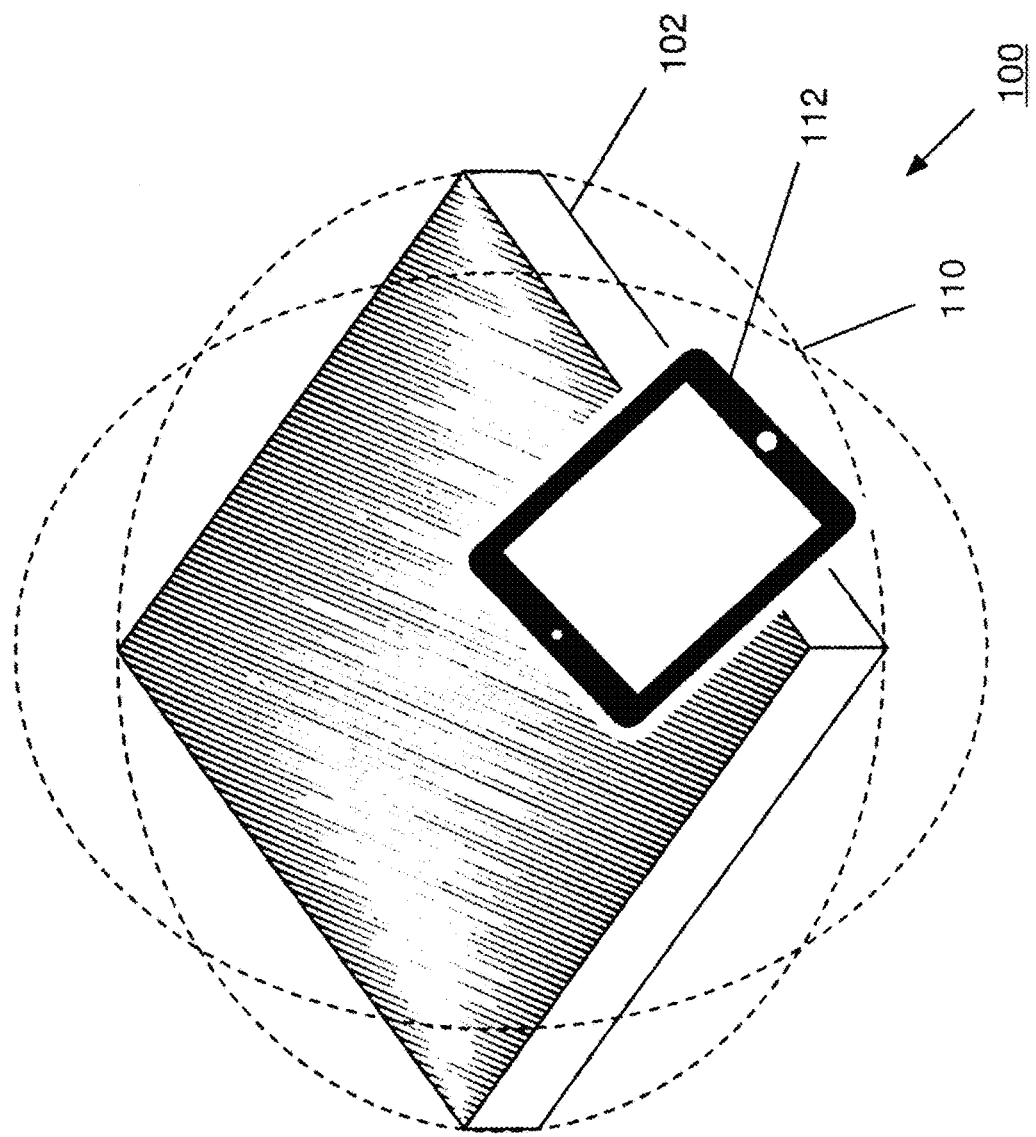
FIG. 6 illustrates a charging proximity transmitter transmitting one or more power waves such that the one or more power waves converge in a three dimensional space to form one or more pockets of energy, in accordance with an embodiment of the present disclosure.

FIG. 6 illustrates a proximity transmitter transmitting one or more power waves such that the one or more power waves converge in a three dimensional space to form one or more pockets of energy, in accordance with an embodiment of the present disclosure. Note that the device 112 is not centrally or specifically aligned/oriented/positioned on the housing 102 to be wirelessly charged via the transmitter of the proximity transmitter 100. Rather, the device 112 can be positioned anywhere on the housing 102 to be wirelessly charged or in the local proximity of the housing 102 to be wirelessly charged, whether with a use of a sensor or communications component, or without the use of the sensor or communications component.

Figure 7:
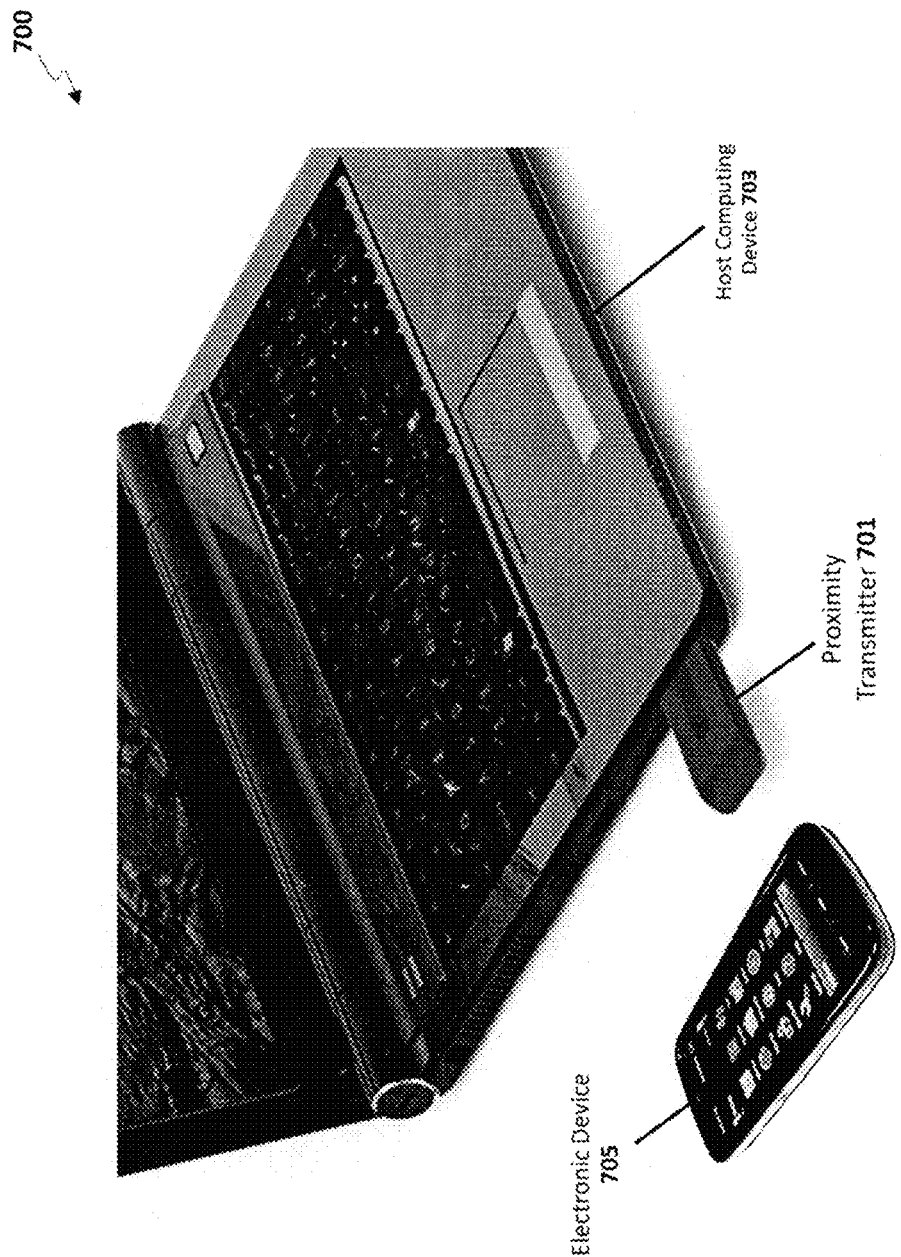
FIG. 7 shows a system for wireless power charging according to an exemplary embodiment.

FIG. 7 shows a system 700 for wireless power charging according to an exemplary embodiment. In the exemplary system 700, the proximity transmitter 701 may be a USB device that couples to a computer 703 or other type of computing device, and may provide wireless power to an electronic device 705, which in the exemplary system 700 comprises an integrated receiver component.

A proximity transmitter 701 may have nearly any form factor or shape. In the system 700 shown in FIG. 7, the proximity transmitter 700 may be a USB device that couples to the computer 703 through a USB port. The proximity transmitter 700 may be directly coupled to the computer 703, as the USB components and transmission components (e.g., antennas, integrated circuits, controller) are integrated into a common housing. However, in some embodiments, the transmission components may be in a separate housing, such that a USB wire couples the proximity transmitter 701 to the computer 703.

The proximity transmitter 701 may comprise any number of wireless transmission components, but may additionally or alternatively capitalize on components of the computer 703. For example, the proximity transmitter 701 may not comprise a communications component, but may instead communicate operational data with the receiver through the computer's communications components, such as the computer's Bluetooth® or Wi-Fi antennas, among others. The proximity transmitter 701 may also draw power from the computer 703 as a power source. It should be appreciated that the proximity transmitter 701 may be coupled to the computer 703 through any type of data port of a computing device 703 that may facilitate wired data and/or power exchanges between the proximity transmitter 701 and the computing device 703, and should not be considered to be limited solely to USB ports.

In some embodiments, the proximity transmitter 701 may comprise an antenna array underneath or on the top surface that may transmit power waves within an inch from the top surface of the proximity transmitter 701. In such embodiments, the proximity transmitter 701 may function as a platform or stand for the electronic device 705, and the antennas may transmit power waves to antennas of the receiver integrated into the electronic device 705.

In some embodiment, the proximity transmitter 701 may comprise antennas situated along the sidewalls of the proximity transmitter 701, whereby the antennas may transmit power waves to the receiver of an electronic device 705, in a direction other than or in addition to directly over top of the proximity transmitter 701. Advantageously, this may allow the proximity transmitter to provide power to an electronic device 705 situated nearby a proximity transmitter 701 and computing device 703, within a threshold distance of the proximity transmitter 701. In many cases, the proximity transmitter 701 may be configured with a threshold distance may be within the range of about one millimeter to about twelve inches. One having skill in the art would appreciate that the threshold distance may vary, and would not necessarily be limited to these distances. It should also be appreciated that the threshold distance in operation is not always exact, as there may be some slight natural variation in waves received and identified by the communications components. The communications components of the proximity transmitter 701 and the receiver may exchange communications signals to determine whether the receiver of the electronic device 705 is within the threshold distance to the proximity transmitter 701. For embodiments where the receiver is an integrated component of the electronic device 705, like the exemplary embodiment shown in FIG. 7, the communications component of the receiver may include one or more of the native communications components of the electronic device 705. Similarly, in some embodiments, the proximity transmitter 701 may use one or more communications components native to the computing device 703.

Figure 8B:
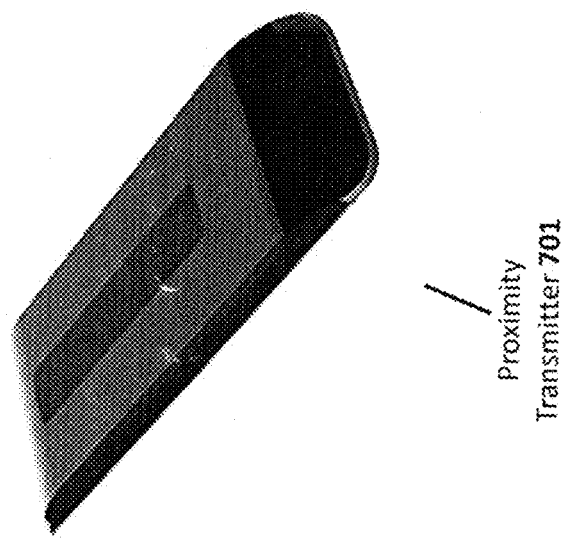
FIG. 8A and FIG. 8B are enlarged, perspective views of the exemplary proximity transmitter shown in FIG. 7.
Figure 8A:
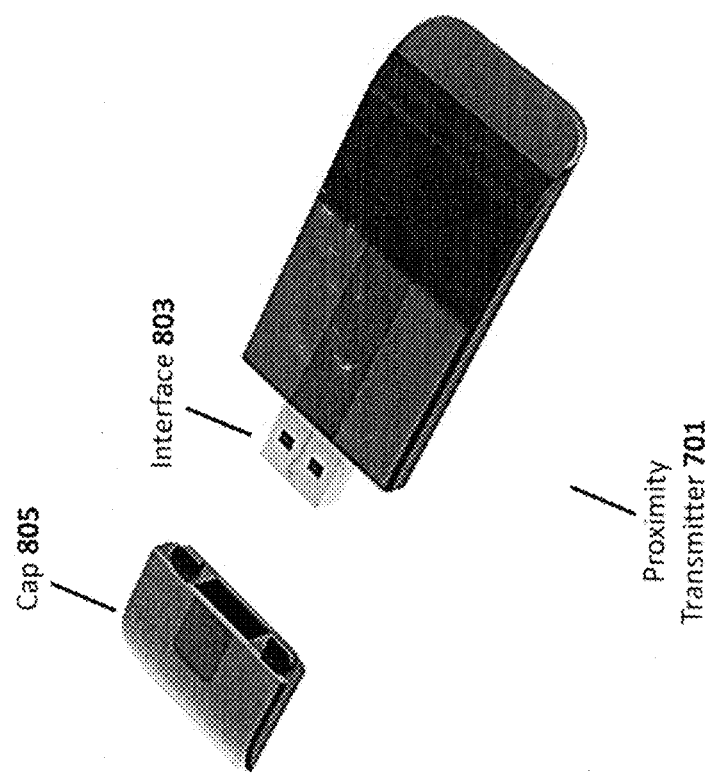

FIG. 8A and FIG. 8B are enlarged, perspective views of the exemplary proximity transmitter 701 shown in FIG. 7. FIG. 8A shows additional details for the proximity transmitter 701, including an interface 803 and a protective cap 805. FIG. 8B shows an optional product form factor in which a cap 805 may be placed over the interface 803 to protect the operations of the interface 803.

The interface 803 of the exemplary transmitter 701 is a "male" USB interface that allows the proximity transmitter to connect to any host device, such as a computer, through a corresponding USB port, either directly through a corresponding "female" USB interface on the host device or indirectly through a "female" to "male" connector. In some implementations, the proximity transmitter 701 may draw power through the port connection from the host device, using the host device as a power source. In some implementations, the proximity transmitter 701 may transmit data and/or instructions related to the operation of the power transmitter 701. In some cases, in order to communicate data and/or instructions, the proximity transmitter 701 may upload and install pre-stored drivers or other software modules to the electronic device, or may instruct the host device to download such drivers or software. One having skill in the art would recognize that the interface 803 may be of any interface type and corresponding port that would allow the proximity transmitter 701 to draw power from the host device and/or would allow the proximity transmitter 701 and host device to exchange operational data and/or operational instructions. Non-limiting examples of the types of interfaces 803 and corresponding ports and protocols allowing peripheral devices to interchangeably connect with host devices may include: Firewire, Thunderbolt, PCI, Ethernet, and the like. Furthermore, the proximity transmitter 701 may operate by interfacing with computing devices of different operating systems, processors, or peripherals. This may involve installing or downloading drivers (e.g., software modules) that configure such devices to communicate with the proximity transmitter 701.

Figure 9:
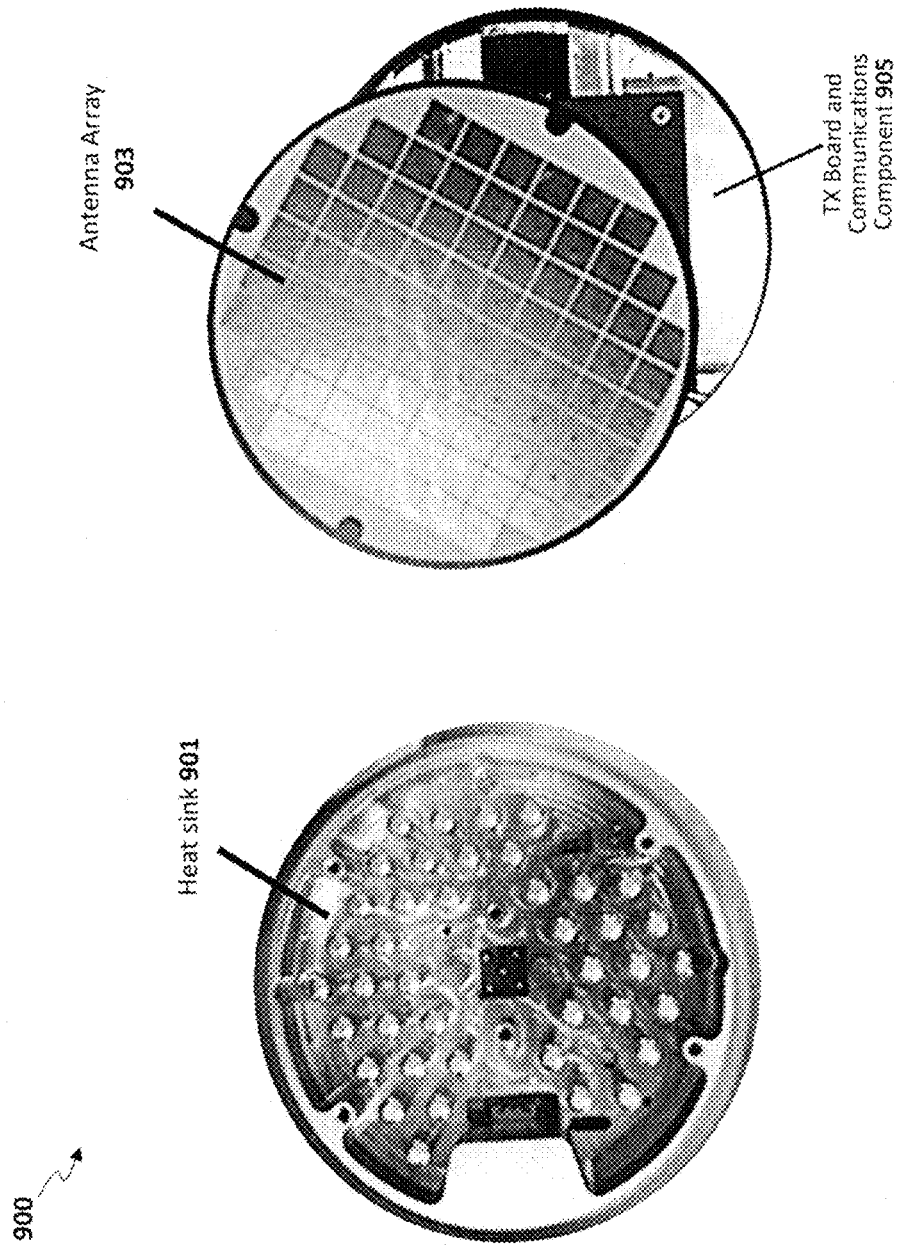
FIG. 9 shows components of a proximity transmitter device, according to an exemplary embodiment.

FIG. 9 shows components of a proximity transmitter 900 device, according to an exemplary embodiment. The exemplary proximity transmitter 900 may comprise a heat sink 901, array of one or more antennas (antenna array 903), and one or more circuit boards 905. The circuit boards 905 may comprise any number of circuits, antennas, processors, or other components capable of performing the various tasks described herein. For example, the circuit boards 905 may include a controller that manages operation of the proximity transmitter 900, such as determining which, if any, antennas of an antenna array 903 should be transmitting power waves, and the characteristics of those power waves. As another example, the one or more circuit boards 905 may include a communications component, such as a Bluetooth® chip and associated antenna, allowing the proximity transmitter to detect receivers, determine whether receivers are within a proximity threshold, and/or to exchange operational data with receivers through some wired-based or wireless communications protocol. It should be understood that additional or alternative components may be included on the one or more circuit boards 905 of the exemplary proximity transmitter 900.

An antenna array 903 may comprise one or more antennas of one or more antenna types, each configured to transmit power waves generated by circuits, such as waveform generators, of a circuit board 905. In some cases, the antenna array 903 may transmit the power waves such that the power waves generate constructive interference patterns at some area in front of the antennas, and within some proximity of the proximity transmitter 900. In some cases, rather than directing the power waves to some convergence point, the antenna array 903 may transmit the power waves as a collection of power waves originating from one or more of the antennas. As an example, in some circumstances there may not be enough distance between the antennas and the receiver to allow the power waves to converge at a particular point, or the antennas may not be configured to adjust the vectors of the power waves, and so a subset of antennas in front of, or in contact with, the receiver may be selected to transmit power waves as a collection of power waves. In some embodiments and in similar circumstances, the antenna array 903 may be slightly concave with respect to a housing surface covering the antenna array 903, and thus the power waves may be generally transmitted at slightly acute angles with respect a middle axis of the antenna array 903, as opposed to alternative embodiments where the antennas are situated parallel to the housing surface covering the antenna array 903.

A heat sink 901 may be a metal construct or other material that may alleviate the amount of heat generated by components of the proximity transmitter 900 during operation. In some circumstances, but not always, a proximity transmitter 900 may generate heat due to the electrical current fed through the circuitry from a power source; this heat might eventually damage components of the transmitter 900, such as the circuitry on the boards 905. The heat sink 901 may be a permanent or detachable component, and may comprise metal, ceramic or other material, configured to dissipate the heat generated by the proximity transmitter 900 components.

Figure 10:
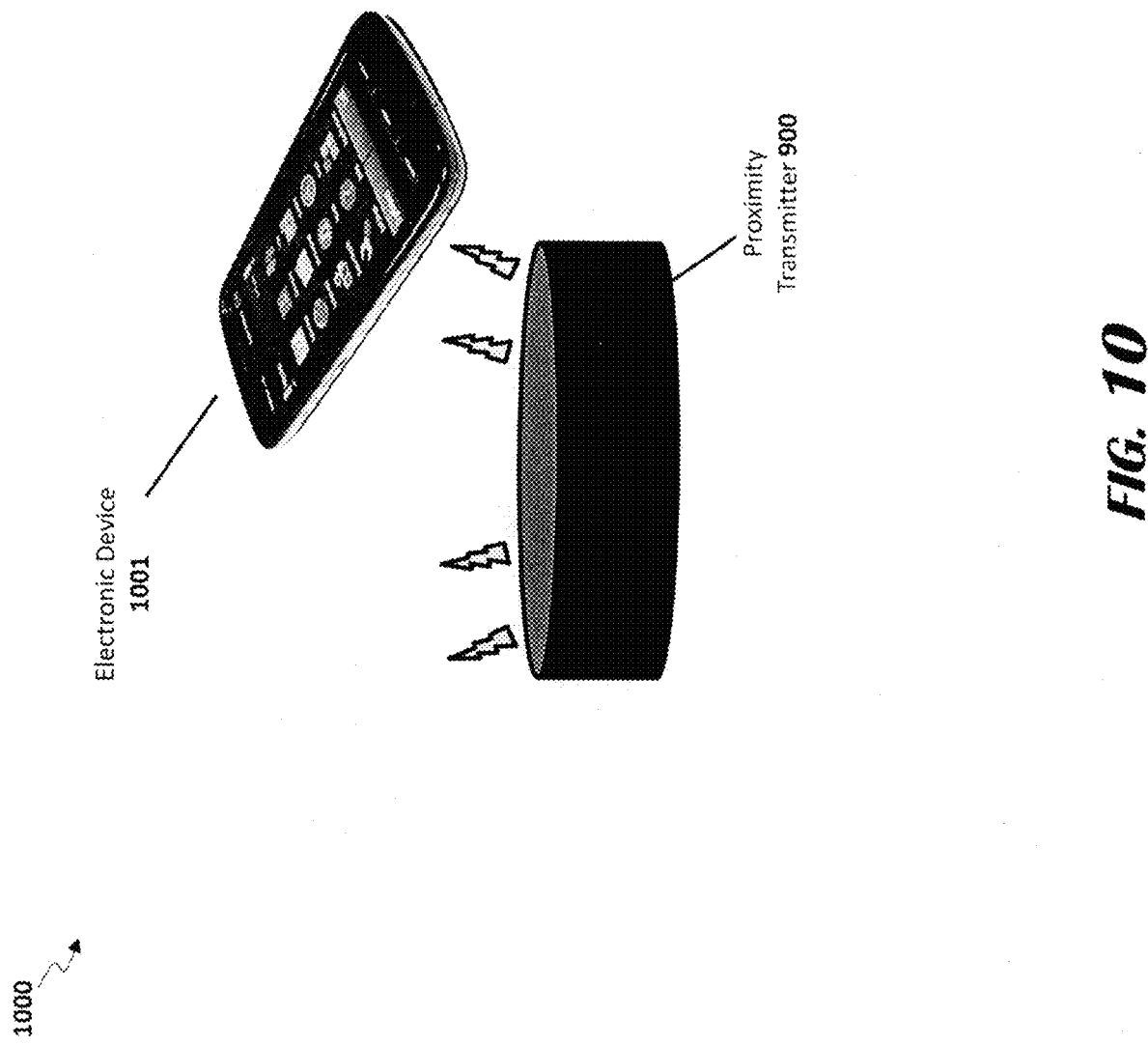
FIG. 10 shows a wireless charging system, according to an exemplary embodiment.

FIG. 10 shows a wireless charging system 1000, according to an exemplary embodiment. The exemplary system 1000 may comprise the exemplary proximity transmitter 900 shown in FIG. 9, and an electronic device 1001. The proximity transmitter 900 may be the product of assembling the components shown in FIG. 9, as well as any number of additional or alternative components. The electronic device 1001 may be any device requiring electric energy and capable of being coupled to or comprising a receiver. In the exemplary embodiment, the electronic device 1001 may be smartphone comprising an integrated receiver.

In operation, the proximity transmitter 900 may detect the presence of the electronic device when the proximity transmitter 900 receives one or more wireless communications signals, such as Bluetooth® or Wi-Fi signals. Based on operational data received in the communications signals, such as signal strength, response time, or some other location data indicating the location and/or proximity of the electronic device 1001, the proximity transmitter 900 may determine whether the electronic device is within a proximity threshold distance from the antenna array. Additionally or alternatively, the proximity transmitter may comprise a sensor, such as a capacitive sensor to sense presence of the electronic device, magnetic sensor for detecting the magnetic waves produced by the electronic device 1001 or a pressure sensor, used to determine a proximity threshold or to determine that the electronic device is in contact with the exterior housing of the proximity transmitter 900. When the proximity transmitter 900 determines that the receiver is within the threshold proximity or is in contact with the proximity transmitter 900 may generate and transmit power waves. In some cases, the proximity transmitter 900 may identify a subset of antennas for transmitting power waves. This may be advantageous in circumstances where the electronic device 1001 does not cover the entire antenna array. This may also be advantageous in circumstances where the proximity transmitter 900 comprises antenna arrays directed outward in different directions of the proximity transmitter 900, thus power transmitter 900 may identify which antenna array to activate based on where the electronic device is located with respect to the proximity transmitter 900.

In some implementations, a receiver, such as the receiver integrated into the electronic device 1001, may be relocated away from the proximity transmitter 900, but may then switch to receiving power waves from non-proximity transmitters (not shown), which may be transmitter devices configured to transmit power waves into a transmission field, but without the proximity limitations of a proximity transmitter 900. Descriptions and examples of non-proximity transmitters may be found in U.S. patent application Ser. No. 14/860,991, filed Sep. 22, 2015, entitled "Systems and Methods for Generating and Transmitting Wireless Power Transmission Waves," which is incorporated by reference herein in its entirety. In such implementations, when the electronic device 1001 is moved away from the proximity of the proximity transmitter 900, or when some other operational condition is violated (e.g., a person's hand is detected between the electronic device 1001 and the antenna array of the proximity transmitter 900), the electronic device 1001 may then communicate with a non-proximity transmitter. When the electronic device 1001 enters the transmission field of the non-proximity transmitter, and when any operational conditions are satisfied (e.g., the person is not within a threshold distance to the power waves of the non-proximity transmitter), the receiver of the electronic device may then begin receiving power waves from the non-proximity transmitter. Conversely, when an electronic device 1001 receiving wireless power from a non-proximity transmitter is moved within proximity parameters (e.g., proximity threshold) of a proximity transmitter 900, the receiver of the electronic device 1001 may discontinue receiving power from the non-proximity transmitter and start receiving power from the proximity transmitter 900. Furthermore, in some embodiments, a receiver may receive power from both a non-proximity transmitter and a proximity transmitter 900 at the same time. In such embodiments, the energy pocket formed at or about the receiver is a combination of the energy pocket created by the non-proximity transmitter as well as the pocket of energy created by the proximity transmitter. Additional descriptions and examples of receivers receiving power from one or more transmitters may be found in U.S. Provisional Patent Application Ser. No. 62/387,466, entitled "Cluster Management of Transmitters in a Wireless Power Transmission System," filed on Dec. 24, 2015.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A wireless charging transmitter comprising:
one or more sensors configured to:
    detect a living being in proximity to the wireless charging transmitter; and
    generate sensor data based on detecting the living being;
an array of antennas configured to transmit power waves to a receiver device; and
a surface layer that is adjacent to the array of antennas, wherein:
    the transmitted power waves converge to form a constructive interference pattern at a non-zero distance from the surface layer, the non-zero distance being based at least in part on the sensor data;
    phases and amplitudes of the transmitted power waves are determined based, at least in part, on the sensor data; and
    the wireless charging transmitter is further configured to lower a power level of the transmitted power waves in response to the one or more sensors detecting the living being.

2. The wireless charging transmitter according to claim 1, wherein the wireless charging transmitter is further configured to cease transmitting the power waves in response to the one or more sensors detecting the living being.

3. The wireless charging transmitter according to claim 1, wherein the wireless charging transmitter is further configured to create transmission nulls at a location of the living being.

4. The wireless charging transmitter according to claim 1, further comprising a communications component configured to receive operational data from the receiver device; and
the phases and amplitudes of the transmitted power waves are also determined based at least in part on the operational data.

5. The wireless charging transmitter according to claim 1, wherein the wireless charging transmitter is configured to transmit the power waves to the receiver device upon the one or more sensors detecting the receiver device being placed on the surface layer.

6. The wireless charging transmitter according to claim 1, wherein when the receiver device is positioned on the surface layer:
the wireless charging transmitter is configured to select a subset of the antennas of the array for transmitting the power waves to the receiver device.

7. The wireless charging transmitter according to claim 6, wherein the subset of the antennas is directly below the receiver device.

8. The wireless charging transmitter according to claim 1, wherein the one or more sensors are selected from the group consisting of a pressure sensor, a magnetic sensor, a contact sensor, a thermal sensor, a static electricity sensor, and a motion sensor.

9. The wireless charging transmitter according to claim 1, wherein the power waves are radio frequency power waves.

10. A method of wirelessly transmitting power comprising:
at a wireless charging transmitter comprising one or more sensors, an array of antennas, and a surface layer that is adjacent to the array of antennas:
    detecting, by the one or more sensors, a living being in proximity to the wireless charging transmitter;
    generating, by the one or more sensors, sensor data based on the detecting of the living being;

determining phases and amplitudes for power waves to be transmitted by the array of antennas based at least in part on the sensor data;

transmitting, by the array of antennas, power waves to the receiver device, wherein the transmitted power waves (i) have the determined phases and amplitudes, and (ii) converge to form a constructive interference pattern at a non-zero distance from the surface layer, the non-zero distance being based at least in part on the sensor data; and in response to the one or more sensors detecting the living being, lowering a power level of the transmitted power waves.

11. The method of claim 10, further comprising, in response to the one or more sensors detecting the living being, ceasing to transmit the power waves.

12. The method of claim 10, further comprising creating, by the wireless transmitter, transmission nulls at a location of the living being.

13. The method of claim 10, wherein:
the transmitter also includes a communications component, and
the method further comprises receiving, by the communications component, operational data from the receiver device, wherein the phases and amplitudes of the transmitted power waves are also based at least in part on the operational data.

14. The method of claim 10, further comprising transmitting, by the wireless charging transmitter, the power waves to the receiver device upon the one or more sensors detecting the receiver device being placed on the surface layer.

15. The method of claim 10, further comprising, in response to detecting the receiver device positioned on the surface layer:
selecting, by the wireless charging transmitter, a subset of the antennas of the array for transmitting the power waves to the receiver device that is positioned on the surface layer.

16. The method of claim 15, wherein the subset of the antennas is directly below the receiver device.

17. The method of claim 10, wherein the one or more sensors are selected from the group consisting of a pressure sensor, a magnetic sensor, a contact sensor, a thermal sensor, a static electricity sensor, and a motion sensor.

18. The method of claim 10, wherein the power waves are radio frequency power waves.

19. A system of wireless power transmission, the system comprising:
a wireless charging transmitter comprising:
one or more sensors configured to:
detect a living being in proximity to the wireless charging transmitter; and
generate sensor data based on detecting the living being;
an array of antennas configured to transmit power waves to a receiver device; and
a surface layer that is adjacent to the array of antennas; and
a controller that is in communication with the wireless power transmitter and is configured to:
determine phases and amplitudes for power waves to be transmitted by the array of antennas based at least in part on the sensor data; and
transmit, by the array of antennas, power waves to the receiver device, wherein the transmitted power waves (i) have the determined phases and amplitudes, and (ii) converge to form a constructive interference pattern at a non-zero distance from the surface layer, the non-zero distance being based at least in part on the sensor data; and
in response to the one or more sensors detecting the living being, lower a power level of the transmitted power waves.

20. The system of claim 19, wherein the controller is configured to: in response to detecting the receiver device positioned on the surface layer:
select, by the wireless charging transmitter, a subset of the antennas of the array for transmitting the power waves to the receiver device that is positioned on the surface layer.

* * * * *